United States Patent
Shipman et al.

(10) Patent No.: US 10,668,968 B2
(45) Date of Patent: Jun. 2, 2020

(54) SEAT POST ASSEMBLY

(71) Applicant: SRAM, LLC, Chicago, IL (US)

(72) Inventors: Christopher Shipman, Chicago, IL (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 70 days.

(21) Appl. No.: 16/017,272

(22) Filed: Jun. 25, 2018

(65) Prior Publication Data

US 2019/0002050 A1 Jan. 3, 2019

Related U.S. Application Data

(60) Provisional application No. 62/527,813, filed on Jun. 30, 2017, provisional application No. 62/580,169, filed on Nov. 1, 2017.

(51) Int. Cl.
*B62J 1/08* (2006.01)
*B62K 19/36* (2006.01)
*B62J 1/06* (2006.01)

(52) U.S. Cl.
CPC . *B62J 1/08* (2013.01); *B62J 1/06* (2013.01); *B62K 19/36* (2013.01); *B62J 2001/085* (2013.01); *B62K 2201/08* (2013.01)

(58) Field of Classification Search
CPC .......... B62J 1/08; B62J 1/10; B62J 2001/085; B62K 23/02; A47C 3/20; A47C 7/008
See application file for complete search history.

(56) References Cited

U.S. PATENT DOCUMENTS

| | | | |
|---|---|---|---|
| 3,081,788 A | 3/1963 | Lewis | |
| 3,083,000 A | 3/1963 | Jack et al. | |
| 3,415,159 A | 12/1968 | Hornlein et al. | |
| 3,948,147 A | 4/1976 | Sauer et al. | |
| 4,245,826 A | 1/1981 | Wirges | |
| 4,257,582 A | 3/1981 | Wirges | |
| 4,445,671 A | 5/1984 | Reuschenbach et al. | |
| 4,465,266 A * | 8/1984 | Hale | A47C 3/30 267/131 |
| 4,592,590 A * | 6/1986 | Slaats | F16F 15/027 108/147 |
| 4,593,951 A * | 6/1986 | Slaats | A47C 3/30 108/147 |
| 4,664,451 A | 5/1987 | Sakaguchi et al. | |
| 5,135,366 A | 8/1992 | Ribeiro | |
| 5,332,260 A | 7/1994 | Heinrichs et al. | |
| 8,333,217 B2 | 12/2012 | Raper et al. | |
| 8,511,655 B2 | 8/2013 | Wu | |
| 2004/0061266 A1 | 4/2004 | Riel et al. | |

(Continued)

FOREIGN PATENT DOCUMENTS

| | | |
|---|---|---|
| CN | 205524616 | 8/2016 |
| DE | 1554251 | 3/1970 |

(Continued)

*Primary Examiner* — Daniel J Wiley

(57) ABSTRACT

A bypass device for a seating component such as an adjustable seating assembly for a bicycle may be provided to redistribute fluid preferentially by density. The bypass device may be operable to redistribute a low density compressible fluid or a mixed phase of low density compressible and high density non-compressible fluids within the seating component.

20 Claims, 21 Drawing Sheets

(56) References Cited

U.S. PATENT DOCUMENTS

2012/0098175 A1    4/2012  Wu
2014/0174286 A1    6/2014  Pittens et al.
2015/0300382 A1  10/2015  Kuo

FOREIGN PATENT DOCUMENTS

| | | |
|---|---|---|
| DE | 2253269 | 5/1974 |
| DE | 2408055 | 8/1975 |
| DE | 3040481 | 5/1982 |
| DE | 102007003407 | 6/2008 |
| DE | 102007012838 | 6/2008 |
| DE | 102010029180 | 11/2011 |
| EP | 1054185 | 11/2000 |
| EP | 3345817 | 7/2018 |
| GB | 951775 | 3/1964 |
| TW | I385094 | 2/2013 |
| TW | M531424 | 11/2016 |
| TW | M538106 | 3/2017 |
| TW | M546161 | 8/2017 |
| TW | M555818 | 2/2018 |
| WO | 9201171 | 1/1992 |

\* cited by examiner

SEAT POST ASSEMBLY

The present application claims priority to Provisional U.S. Patent Application No. 62/527,813, filed Jun. 30, 2017, and to Provisional U.S. Patent Application No. 62/580,169, filed Nov. 1, 2017.

FIELD OF THE INVENTION

The present application generally relates to seats for bicycles, and more particularly to an adjustable seat post assembly for a bicycle seat.

BACKGROUND OF THE INVENTION

A bicycle may be equipped with a component such as an adjustable seating assembly. Such a component may be advantageous to allow selective lowering and raising of a saddle while the bicycle is in operation. For example, a rider may benefit from a lower saddle height while descending an incline through greater control achieved by more range of motion. Conversely, a rider may benefit from a higher saddle height while ascending an incline through a position allowing greater power transfer to a drivetrain of the bicycle. By allowing selective height adjustment of the saddle during operation, the bicycle may be configured to provide an appropriate seating position for varying conditions.

A typical bicycle seating assembly may have a seat post that is mechanically clamped to a seat tube of the bicycle. The clamp may be a fastener or lever that is released to allow an increase in an inside diameter of the seat tube in order to facilitate sliding the seat post up or down, thus adjusting the saddle height. Such a seating assembly does not facilitate user-friendly adjustment while the bicycle is in operation. An adjustable seating assembly for a bicycle may be designed for relatively quick adjustment of the saddle height within a defined range. Such systems may commonly be known as dropper seat posts, and may also use remote activation to improve the usability during operation. Such remote activation may be actuated by cable tension, hydraulic pressure, electronic signal, or other actuation methods. The remote activation may trigger movement within a linear movement mechanism. The linear movement mechanism may include a spring, such as a coil spring or a pneumatic spring; an electronic device, such as a servo or motor, or another type of linear actuator or component thereof. Such a linear movement mechanism may be designed to provide power for movement in both a raising direction and a lowering direction, as with a reversible electric motor, or the linear movement mechanism may provide bias in only one direction, such as with a spring. For example, a pneumatic spring may be provided to bias the seating assembly in the raising direction with enough force that the saddle height may be increased by actuation while the rider is not applying downward force to the saddle but with less force than a gravitational force acting on the rider's mass applied to the saddle such that the rider's weight may be used to decrease the saddle height. A locking mechanism may be provided to prevent actuation of the linear movement mechanism and thus provide a stable seating platform at a fixed saddle height.

A hydraulic locking mechanism of an adjustable seating assembly biased in the raising direction may provide positive support of the seating assembly in the raising direction when the system is static and not actuated. The hydraulic locking mechanism may provide more finely-modulated adjustment of saddle height in contrast to systems that use ratchet- or detent-type locking mechanisms. The hydraulic locking mechanism also avoids problems associated with friction-type locking mechanisms such as slippage. A hydraulic locking mechanism may function by supporting a movable portion of the seating assembly with an adjustable volume of minimally-compressible or non-compressible fluid, which may be referred to as non-compressible fluid for convenience. In general, non-compressibility will hereinafter refer to fluids, states, or components configured for insubstantial compressibility, such as in hydraulic fluids or pressure-transmitting configurations. For instance, a volume of hydraulic fluid may be contained within a support chamber of the seating assembly with a volume control valve selectively operable to allow adjustment of the volume. Conversely, the term compressible will refer to fluids with relatively high compressibility, such as those fluids in a gaseous state or which would substantially interfere with hydraulic pressure transfer.

The adjustable volume may be increased by a source of stored potential energy, such as a compressed pneumatic spring, being released to force part of a reservoir volume of hydraulic fluid into the support chamber, thus increasing the volume contained within the support chamber and increasing the saddle height. In this scenario, if the volume control valve is opened when the force of the rider's weight on the support chamber exceeds the force applied on the reservoir volume by the pneumatic spring, the volume of the support chamber and thus the saddle height will decrease. The force required to overcome the force of the spring bias may be tunable by adjusting pressure or working surface area of components.

Hydraulic systems relying on the non-compressibility of hydraulic fluid may degrade in performance due to ingress of compressible fluids. For example, gasses present in the atmosphere or contained within a pneumatic spring of the adjustable seating assembly may enter a support chamber such as a hydraulic support chamber. Under pressure, these compressible fluids will compress and allow deflection of the adjustable seating assembly. In contrast, it may be advantageous to have no or very little movement in a seating assembly, for instance to promote more efficient energy transfer to the drivetrain of the bicycle. Because ingress of gasses may occur in a hydraulic system, a facility for releasing gasses from such a system may be advantageous. Such issues may also arise in other hydraulic components of a bicycle, for instance front and rear suspension components, to which such a facility may also apply.

SUMMARY

One aspect of the invention provides a seating component for a bicycle, comprising an upper; a lower connected to the upper and movable relative to the upper along an axis; a support chamber disposed between the upper and the lower; a reservoir in selective fluid communication with the support chamber across a valve; a spring portion configured to bias the upper apart from the lower along the axis; and a bypass configured to provide fluid communication between the support chamber and the reservoir. The bypass comprises an opening disposed beyond the support chamber in a lowering direction along the axis; and a barrier configured to facilitate flow from the opening to the valve, wherein the valve is disposed beyond the support chamber in a raising direction along the axis.

Another aspect of the invention provides a seating component for a bicycle, comprising an upper; a lower connected to the upper and movable relative to the upper along an axis; a support chamber disposed between the upper and the lower; a reservoir in selective fluid communication with the support chamber across a valve; a spring portion configured to bias the upper apart from the lower along the axis; and a bypass configured to provide fluid communication between the support chamber and the reservoir. The bypass comprises a first opening; and a second opening disposed beyond the support chamber in a lowering direction along the axis, wherein flow between the valve and the second opening passes through the first opening.

Yet another aspect of the invention provides a seating component for a bicycle, comprising: an upper; a lower connected to the upper and movable relative to the upper along an axis; a support chamber disposed between the upper and the lower; a reservoir in selective fluid communication with the support chamber across a valve; a spring portion configured to bias the upper apart from the lower along the axis; and a flow path configured to provide fluid communication between the support chamber and the reservoir. The flow path comprises a first opening; and a second opening disposed beyond the support chamber in a lowering direction along the axis, wherein flow between the valve and the second opening passes through the first opening.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

A seating assembly may be configured to avoid these problems. A seating assembly that is simple in user operation may reduce or eliminate the need for regular service intervals of hydraulic components. Particularly on a bicycle, a component should be lightweight and compact to minimize interference with and resistance to riding a bicycle. A bypass device may be configured to address these needs.

Figure 1:
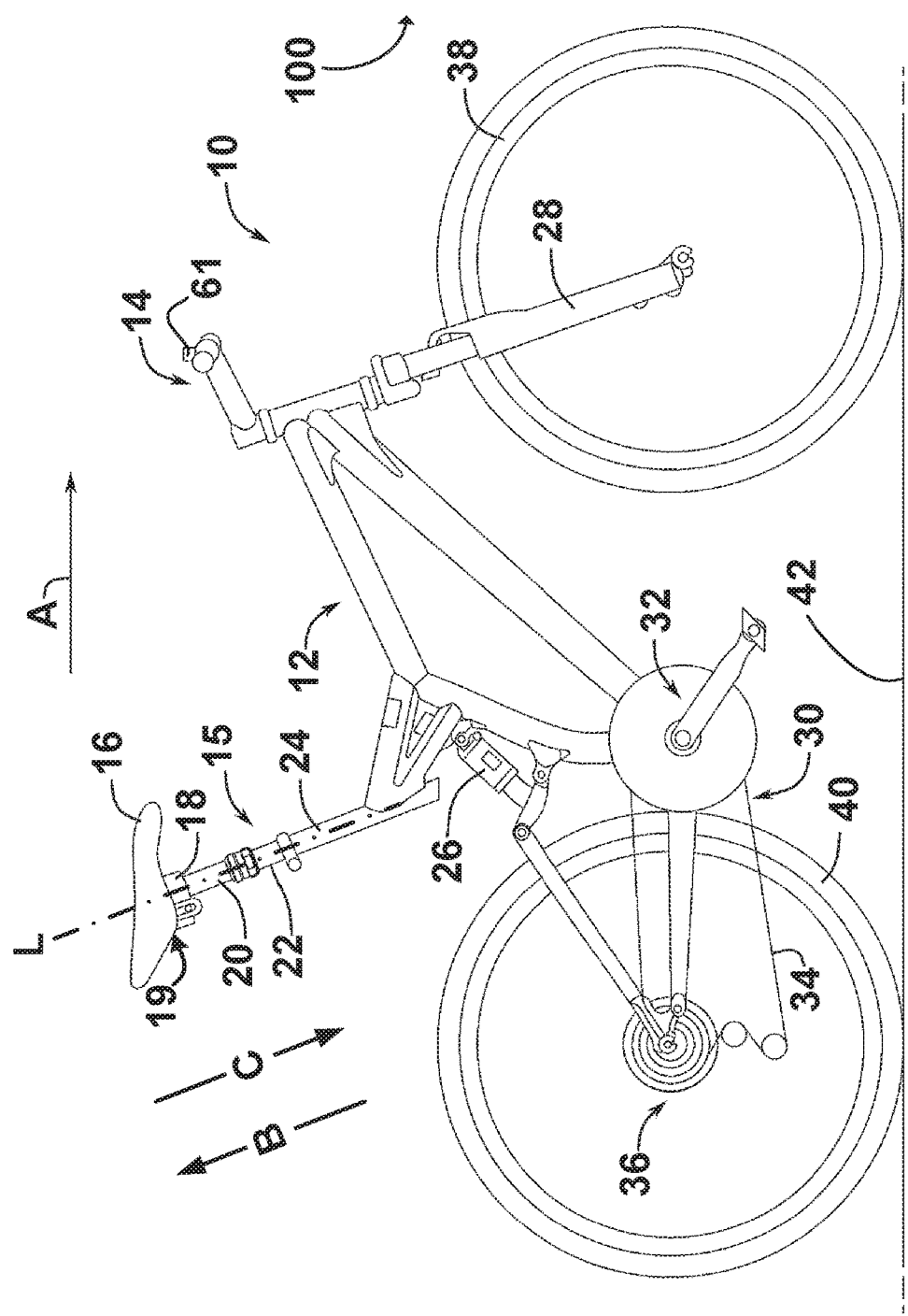
FIG. 1 is a side view of an off road type bicycle, which may be used to employ a bypass device.

FIG. 1 is a side view of an off-road type configuration of a bicycle 10 which may be used to employ a bypass device. The bicycle 10 has a frame 12. A front shock absorber 28 is connected to the frame 12 and is steerable with a handlebar 14. A rear shock absorber 26 is connected to the frame 12. The front shock absorber 28 and the rear shock absorber 26 each connect to a wheel 36, having a rim 38 with a tire 40. The wheel 36 connected to the frame 12 with the rear shock absorber 26 may be driven with the drivetrain 30. The drivetrain 30 may translate rotational movement of a crank 32 to rotational movement of the wheel 36 through a chain 34. Frictional interaction between the tire 40 of the wheel 36 and an external surface 42 then translates the rotational movement of the wheel 36 into linear movement of the bicycle 10 in a forward direction A. A seating component 15 attaches to a seat tube 24 of the frame 12. The seating component 15 includes a seat post lower 22, operably associated with a seat post upper 20. The seat post upper 20 may include a seat post head 18. The seat post upper 20, and specifically the seat post head 18, may include a saddle connection portion 19 for connecting to a saddle 16. The saddle connection portion 19 may directly attach to the saddle 16 or may interface with another component, such as in what is known as a seat mast configuration. The saddle 16 may also be integral.

The saddle 16 is configured to be movable along an axis L. The saddle 16 may be movable in a raising direction B and in a lowering direction C along the axis L. For example, the seat post upper 20 may be fixedly attached to the saddle 16 and be movable within the seat post lower 22 along the axis L. Features may be added or configurations changed to limit movement relative to the axis L. For instance, features of the seat post upper 20 and the seat post lower 22 may inhibit movement past an upper point in the raising direction B and past a lower point in the lowering direction C. Additionally, the seat post upper 20 and the seat post lower 22 may include features or configurations to inhibit relative rotation about the axis L. For example, one or more protrusions (not shown) of the seat post upper 20 may be keyed with features (not shown) of the seat post lower 22.

While the illustrated bicycle 10 of FIG. 1 represents a fully-suspensioned off road type bicycle, the present invention contemplates application to bicycles of any type, including road type bicycles, time trial or triathlon bicycles, and fully or partially-suspensioned mountain bicycles. The seating component 15 may be integrated into the frame 12. For instance, the seat post lower 22 and the seat tube 24 may be integrated.

Figure 2:
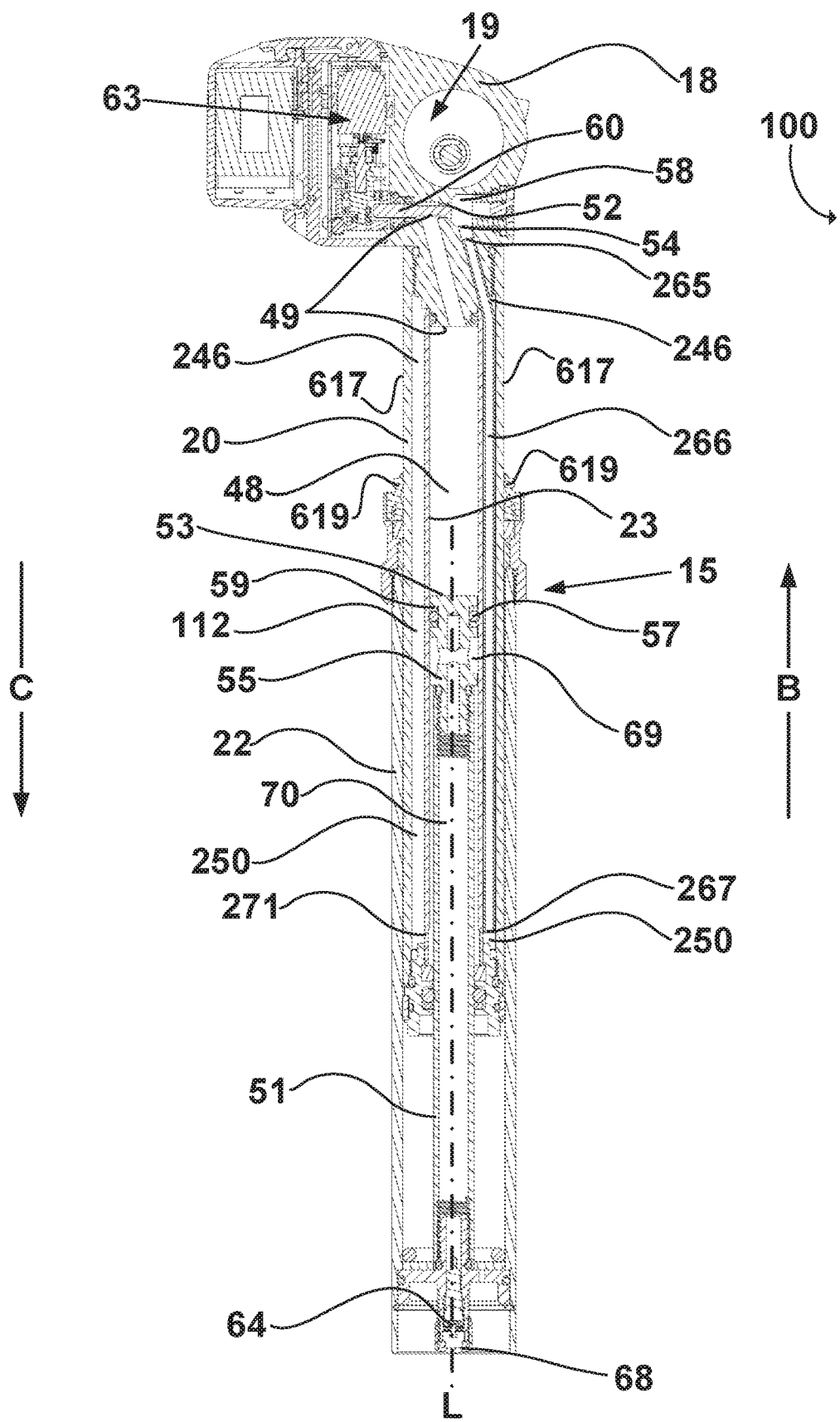
FIG. 2 is a bisected cross-sectional view of an embodiment of a seating component.

FIG. 2 is a bisected cross-sectional view of an embodiment of the seating component 15. The seat post upper 20 is shown slidably received within the seat post lower 22. The seat post upper 20 and the seat post lower 22 are shown having generally cylindrical configurations but may also be otherwise configured. For example, the seat post upper 20 and the seat post lower 22 may be configured so as to have oblong or polygonal radial cross-sections in order to facilitate aerodynamics, rigidity, packaging efficiency, and/or application compatibility to specific configurations of the bicycle 10.

The seat post lower 22 may also be configured such that at least a portion of the seat post lower 22 is received within the seat post upper 20. For instance, the seat post lower 22 may have a guide 51 received within the seat post upper 20. A communication chamber 112 is provided at least partially within the seat post upper 20 and/or the seat post lower 22. The communication chamber 112 may have a pneumatic spring portion 246. The pneumatic spring portion 246 may provide a pressure to bias the seating component 15 in the raising direction B. The pressure contained within the pneumatic spring portion 246 may be fixed or may be adjustable, such as through a pneumatic spring adjustment valve 64. The pneumatic spring adjustment valve 64 as shown is a Schrader type valve but may be another type of valve. For example, the pneumatic spring adjustment valve 64 may be a pressure-sealed valve type such as a Presta valve, a check valve type, or another type of valve operable to provide pneumatic adjustment of the pneumatic spring. Fluid added through the pneumatic spring adjustment valve 64 may communicate through an adjustment path 70 to an adjustment opening 69. The adjustment valve 64 may be covered by an adjustment valve cover 68. For example, the adjustment valve cover 68 may provide sealing and/or protective cover for the adjustment valve 64. From the adjustment opening 69, fluid may communicate with the communication chamber 112.

The pneumatic spring portion 246 may interact with a reservoir portion such as a hydraulic reservoir portion 250 of the communication chamber 112 directly. The hydraulic reservoir portion 250 is in selective fluid communication with a support chamber such as a hydraulic support chamber 48, for instance through a bypass device 266, in fluid communication with a reservoir opening 54, in fluid communication with a hydraulic exchange chamber 58, in fluid communication with an actuation valve 52 that is selectively operable to facilitate fluid communication between the hydraulic exchange chamber 58 and the hydraulic support chamber 48.

An actuation device 63 may be provided. The actuation device 63 may include an actuation member 60. The actuation member 60 is configured to operate the actuation valve 52. The actuation device 63 may be manually operated, for instance through direct actuation of the actuation member 60 by the rider. The actuation device 63 may alternatively include other actuation configurations, such as an electro-mechanical motor, a cable actuation device, a hydraulic actuation device, or other actuation facility. A remote device 61 may be provided to operate the actuation device 63, for instance from the handlebar 14. In an embodiment, the actuation device may operate using any technique. For example, the actuation device may be operated using a cable assembly.

In an embodiment, the actuation device may communicate with the remote device using wireless communication techniques to control the operation of the actuation device. In an embodiment, the actuation device may include a power source, such as a battery or battery assembly, configured to provide power to components of the actuation device, or other portions of the seat post assembly. For example, the power supply may provide power to a motor or other electrically operated motive device. In an embodiment involving wireless communication, the power supply may provide power to a wireless communication device of the actuation device and/or the seat post assembly. In an embodiment, the power supply is integrated with the actuation device. For example, the power supply may be removably attached to an external portion of the actuation device.

The actuation member 60 may be selectively operable to allow fluid communication, for instance of compressible and/or non-compressible fluids, past the actuation valve 52 into the hydraulic exchange chamber 58.

When the actuation valve 52 is in a closed state and thus blocking fluid passage therethrough, the hydraulic support chamber 48 may contain a fixed volume of non-compressible fluid. In a closed state, the hydraulic support chamber 48 is configured to inhibit relative movement of the seat post upper 20 towards the seat post lower 22 in the lowering direction C along the axis L. For example, the hydraulic support chamber 48 may have an upper support surface 49 fixed in at least the raising direction B relative to the seat post upper 20 and a lower support surface 53 fixed at least in the lowering direction C relative to the seat post lower.

The lower support surface 53 may be a portion of a piston 55. The piston 55 may include a piston seal 57 configured to seal during relative movement of the piston 55 and another component of the seating component 15. For instance, the piston 55 may have a dynamic sealing arrangement configuration of the piston seal 57. The dynamic sealing arrangement may be configured to seal against an inner surface 23 of the seat post upper 20. In an embodiment, the piston seal 57 is an O-ring configured to seal against an annular configuration of the inner surface 23. The piston seal 57 may be supported by one or more of a radial expansion device 59. The radial expansion device 59 may be of a split ring configuration and is configured to contact the inner surface 23 and the piston seal 57. The radial expansion device 59 may prevent harmful deformation of the piston seal 57 into any gap between the piston 55 and the inner surface 23.

The piston 55 may be fixed relative to the seat post lower 22. For instance the piston 55 may have a piston attachment portion 526 attachable to the guide 51. The piston attachment portion 526 may form a threaded engagement with the guide 51 or may be press fit, adhesively bonded, or otherwise attached. The piston 55 may also be integrally formed with the guide 51.

In this exemplary embodiment, a scenario in which a force in the lowering direction C applied to the seat post upper 20 is balanced with a force in the raising direction B applied to the seat post lower 22 would cause no substantial relative movement between the seat post lower 22 and the seat post upper 20. Instead, the hydraulic support chamber 48, when filled with a fixed volume of non-compressible fluid, would provide sufficient forces through the upper support surface 49 and the lower support surface 53 to resist any such relative movement. However, when the hydraulic support chamber 48 contains a volume of a compressible fluid, as through gas ingress, such force would result in compression of the compressible fluid and thus relative movement between the seat post upper 20 and the seat post lower 22. In order to maintain a non-compressible state of the hydraulic support chamber 48, the seating component 15 may be configured with the bypass device 266.

The bypass device 266 may have a bypass proximal opening 265 and a bypass distal opening 267. Fluid communication between the hydraulic support chamber 48 and the bypass distal opening 267 must first pass through the bypass proximal opening 265. The bypass distal opening 267 opens to the hydraulic reservoir portion 250 of the communication chamber 112. The hydraulic reservoir portion 250 may also be known as a hydraulic reservoir chamber. Pressure in the communication chamber 112 may facilitate fluid communication through the bypass device 266. For example, pressurized fluid in the pneumatic spring portion 246 may act on non-compressible fluid in the hydraulic reservoir portion 250.

When the actuation valve 52 is in an open state, this fluid pressure will result in non-compressible fluid flow from the hydraulic reservoir portion 250, through the bypass distal opening 267, through the bypass proximal opening 265, into the hydraulic exchange chamber 58, across the actuation valve 52, and into the hydraulic support chamber 48. A force resultant from an increase in fluid pressure in the hydraulic support chamber 48 may act to move the seat post upper 20 away from the seat post lower 22 in the raising direction B. For example, pressure may act on the upper support surface 49 of the seat post upper with a resultant force in the raising direction B and on the lower support surface 53 of the seat post lower with a resultant force in the lowering direction C, thus forcing the seat post upper 20 and the seat post lower 22 apart.

Also when the actuation valve 52 in the open state, a force on the saddle 16 in the lowering direction C that exceeds the force resultant from fluid pressure will act to move the seat post upper 20 in the lowering direction C. In such a moving state, fluid from the hydraulic support chamber 48 will communicate across the actuation valve 52, into the hydraulic exchange chamber 58, through the bypass device 266 via its bypass proximal opening 265 and its bypass distal opening 267, and into the hydraulic reservoir portion 250 of the communication chamber 112. Such communication of non-compressible fluid will act to compress compressible fluid contained in the pneumatic spring portion 246 of the communication chamber 112.

Fluid communicated out of the bypass distal opening 267 and into the communication chamber 112 will distribute according to gravity separation. For example, a two phase flow of relatively low density compressible fluid and relatively high density non-compressible fluid entering the communication chamber 112 through the bypass distal opening 267 may separate in the communication chamber 112. Separation of the fluids may result in the low density compressible fluid rising to the pneumatic spring portion 246 and the high density non-compressible fluid remaining in the hydraulic reservoir portion 250. In this example, fluid in the hydraulic reservoir portion will preferentially remain high density non-compressible fluid.

When the actuation valve 52 is in the closed state, fluid pressure in the hydraulic reservoir portion 250 cannot communicate across the actuation valve 52 and thus cannot act in the hydraulic support chamber 48. If the hydraulic support chamber 48 contains any compressible fluids in this state, then a force on the saddle 16, such as from the rider, may act to compress those fluids, resulting in movement of the seat post upper 20 and thus the saddle in the lowering direction C along the axis L. This often undesirable movement may be known as a sag condition.

The seating component 15 may be configured such that flow across the actuation valve in the open state from the hydraulic support chamber 48 to the communication chamber 112 will move above the pneumatic spring portion 246 in the raising direction B before entering the hydraulic reservoir portion 250. This movement above the pneumatic spring portion 246 may be facilitated by a configuration of the hydraulic exchange chamber 58. For example, fluid may flow from the hydraulic support chamber 48 to the hydraulic exchange chamber 58, above the pneumatic spring portion 246 in the raising direction B. At this point, gravity separation may result in low density compressible fluids from the hydraulic support chamber 48 preferentially entering the hydraulic exchange chamber 58.

The bypass device 266 may be configured to facilitate flow from the hydraulic exchange chamber 58 to the hydraulic reservoir portion 250 below the pneumatic spring portion 246 in the lowering direction C. Such flow may therefore pass through the pneumatic spring portion 246 while not in fluid communication with the pneumatic spring portion 246. Such flow may also bypass through other portions of the seating component 15, such as the hydraulic support chamber 48 and/or the lower support surface 53. In an embodiment, fluid communication between the hydraulic exchange chamber 58 and the pneumatic spring portion 246 may only be indirect fluid communication which must first flow through the hydraulic reservoir portion 250 as an intermediate step.

The seating component 15 may be configured to facilitate two phase flow from the hydraulic support chamber 48 to the communication chamber 112. For example, the seating component 15 may be configured such that in an installed state gravity separation facilitates preferential flow of low density compressible fluids to the hydraulic exchange chamber 58. The hydraulic exchange chamber 58 may be configured to be above the hydraulic support chamber 48 and/or the pneumatic spring portion 246 in the raising direction B in an installed state. The hydraulic exchange chamber 58 may also be configured to facilitate or maintain combined two phase flow. For example, the hydraulic exchange chamber 58 may be configured with a tuned volume to prevent phase separation at a flow rate achievable through operation of the seating component 15.

The seating component 15 may also be configured to facilitate phase separation of two phase flow in the communication chamber 112. For example, two phase flow through the bypass distal opening into the hydraulic reservoir portion 250 of the communication chamber 112 may separate due to gravity separation during flow and/or in a rest state due to closure of the actuation valve or equilibrium of relevant forces in the raising direction B and the lowering direction C. Such separation may facilitate maintenance of low density compressible fluids in the pneumatic spring portion 246 and/or high density non-compressible fluids in the hydraulic reservoir portion 250.

The seating component 15 may also be configured to facilitate preferential flow of high density non-compressible fluids from the communication chamber 112 to the hydraulic support chamber 48. For example, displacement of low density compressible fluids from the hydraulic reservoir portion 250, as through gravity separation, may facilitate flow of only high density non-compressible fluids from the communication chamber 112 into the bypass device 266 through the bypass distal opening 267. Volume of high density non-compressible fluid may be tunable such that the bypass distal opening 267 remains in communication with high density non-compressible fluid in the hydraulic reservoir portion 250. For example, the seating component 15 may be configured such that when the seat post upper is fully extended in the raising direction B, sufficient volume of high density non-compressible fluid is provided to displace all other fluid from the hydraulic support chamber 48, the hydraulic exchange chamber 58, the bypass device 266, and at least a portion of the communication chamber 112 in communication with the bypass distal opening 267.

Figure 3:
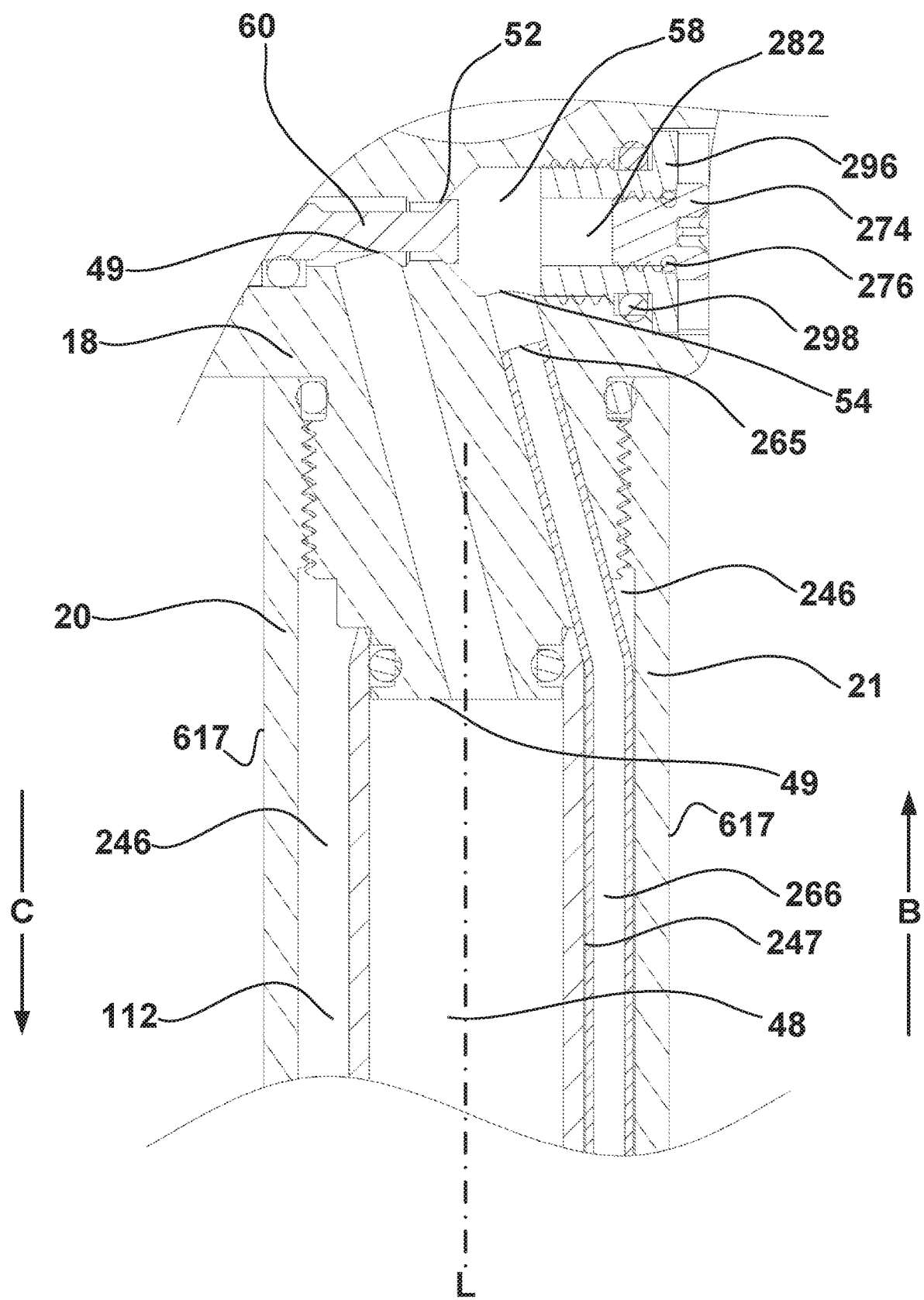
FIG. 3 is an enlarged view of the seating component of FIG. 2, illustrating detail of a seat post upper and associated components.

FIG. 3 is an enlarged view of the seating component 15 of FIG. 2, illustrating detail of the seat post upper 20 and associated components. The embodiment shown of the seating component 15 includes the bypass device 266, having the bypass proximal opening 265. The bypass proximal opening 265 opens to the hydraulic exchange chamber 58 through the hydraulic reservoir chamber 250 and its reservoir opening 54. In such a way, the bypass proximal opening 265 is the nearest point of the bypass device 266 to fluid communication with the hydraulic reservoir chamber 250 and thus the hydraulic support chamber 48 through the actuation valve 52.

The bypass device 266 shown is of a generally annular configuration displaced between an upper wall 21 of the seat post upper 20 and the hydraulic support chamber 48. However, the bypass device 266 may be configured in various ways. For example, the bypass device 266 may be of a polygonal configuration or may be disposed in a concentric manner about the hydraulic support chamber 48 and/or within the upper wall 21 as in an embodiment represented in FIG. 6. In a similar manner, the bypass device 266 may be configured in relation to the configuration of the seating component 15. For example, a generally polygonal configuration of the seating component 15 may employ a similar generally polygonal configuration of the bypass device 266.

The seating component 15 may also be configured to facilitate fluid removal, addition, or replacement, which may be known as bleeding or flushing. For example, the seating component 15 may include a bleed component 274. The bleed component 274 may be sealingly attached to another component of the seating component 15. For example, the bleed component 274 may be sealingly attached with a bleed seal 276 to an installation component 296. The bleed component 274 may be removably to access a bleed path 282. The bleed path 282 may be used to add and/or remove fluids from the seating component 15. The bleed component 274 may be threadably installed, for instance the bleed component may have male threads received within female threads of the installation component 296. The bleed component 274 may alternatively be attached to other components and may seal in other ways. For example, the bleed component 274 may be secured with a latch (not shown) to the seat post head 18 with an integral embodiment of the bleed seal 276.

The installation component 296 may be configured to be attachable to another component of the seating assembly 15. For example, the installation component 296 may sealingly attach to the seat post head 18 with an installation seal 298. The installation component 296 may threadably install into the seat post head 18. For example, the seat post head 18 may have female threads configured to accept installation of male threads of the installation component 296. In one embodiment, the seating component 15 is configured such that when the installation component 296 is in an uninstalled state, the removal of other components of the seating component 15 is facilitated. For example, the actuation member 60 may be sized and shaped to be installed or removed through the portion of the seating component 15 from which the installation component 296 was removed.

The bleed component 274 and/or the installation component 296 may be configured to facilitate installation of a bleed device (not shown). For example, there may be female threads of the installation component 296 with which male threads of the bleed component 274 may interface. The bleed device (not shown) may function to create a pressure differential as through the operation of a reciprocating pump like the pushing or pulling of a syringe. Such a device may have male threads with which the installation component 296 is configured to interface with its female threads when the bleed component 274 is in an uninstalled state. In such a way, fluid may be added or removed to the seating component 15 through the bleed path 282.

Figure 4:
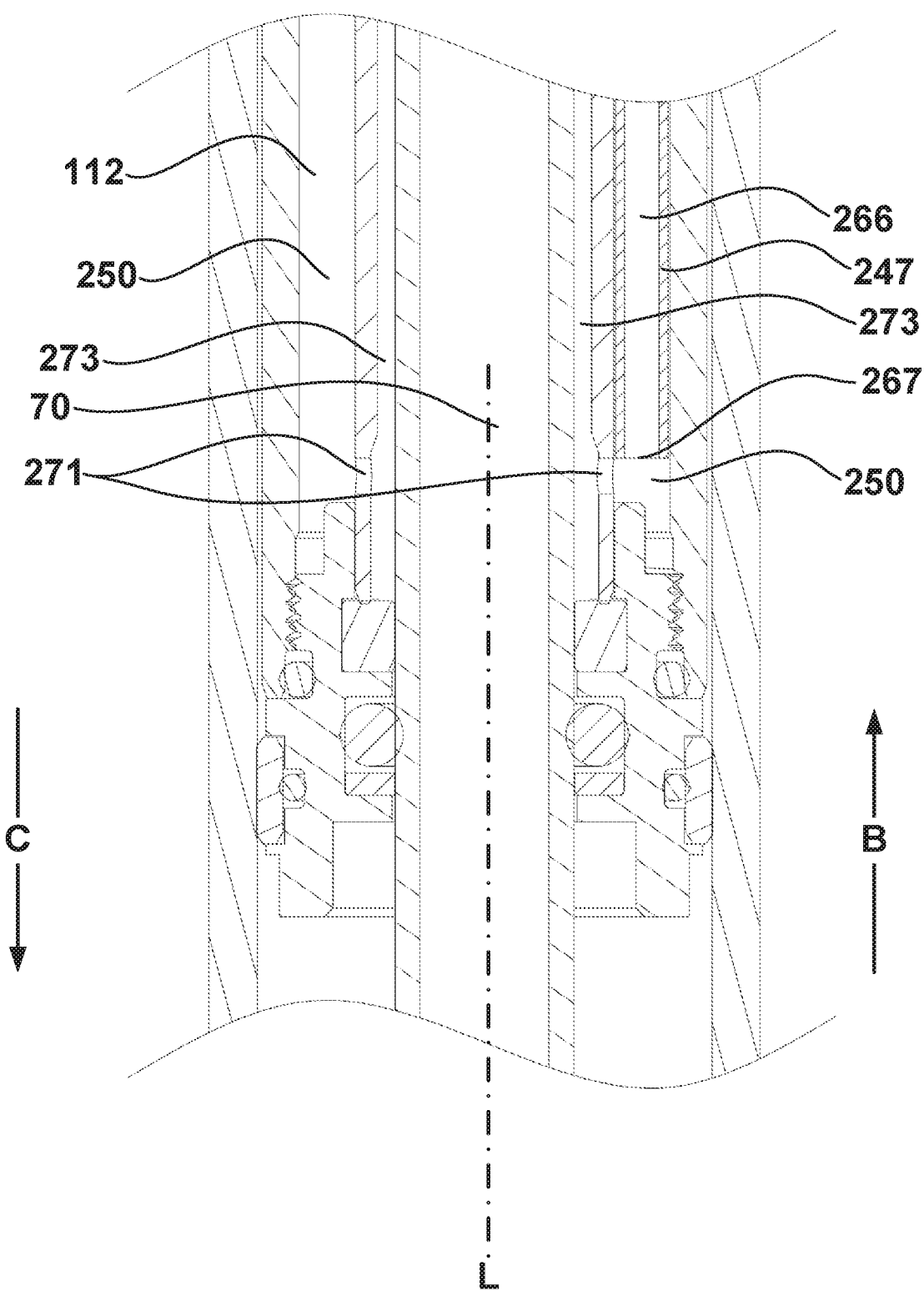
FIG. 4 is an enlarged view of the seating component of FIG. 2, illustrating detail of a seat post lower and associated components.

FIG. 4 is an enlarged view of the seating component 15 of FIG. 2, illustrating detail of the seat post lower 22 and associated components. The adjustment path 70 is in communication with an entry path 273 through the adjustment opening 69. The entry path 273 is in fluid communication with the communication chamber 112 through at least one of an entry opening 271.

Figure 5:
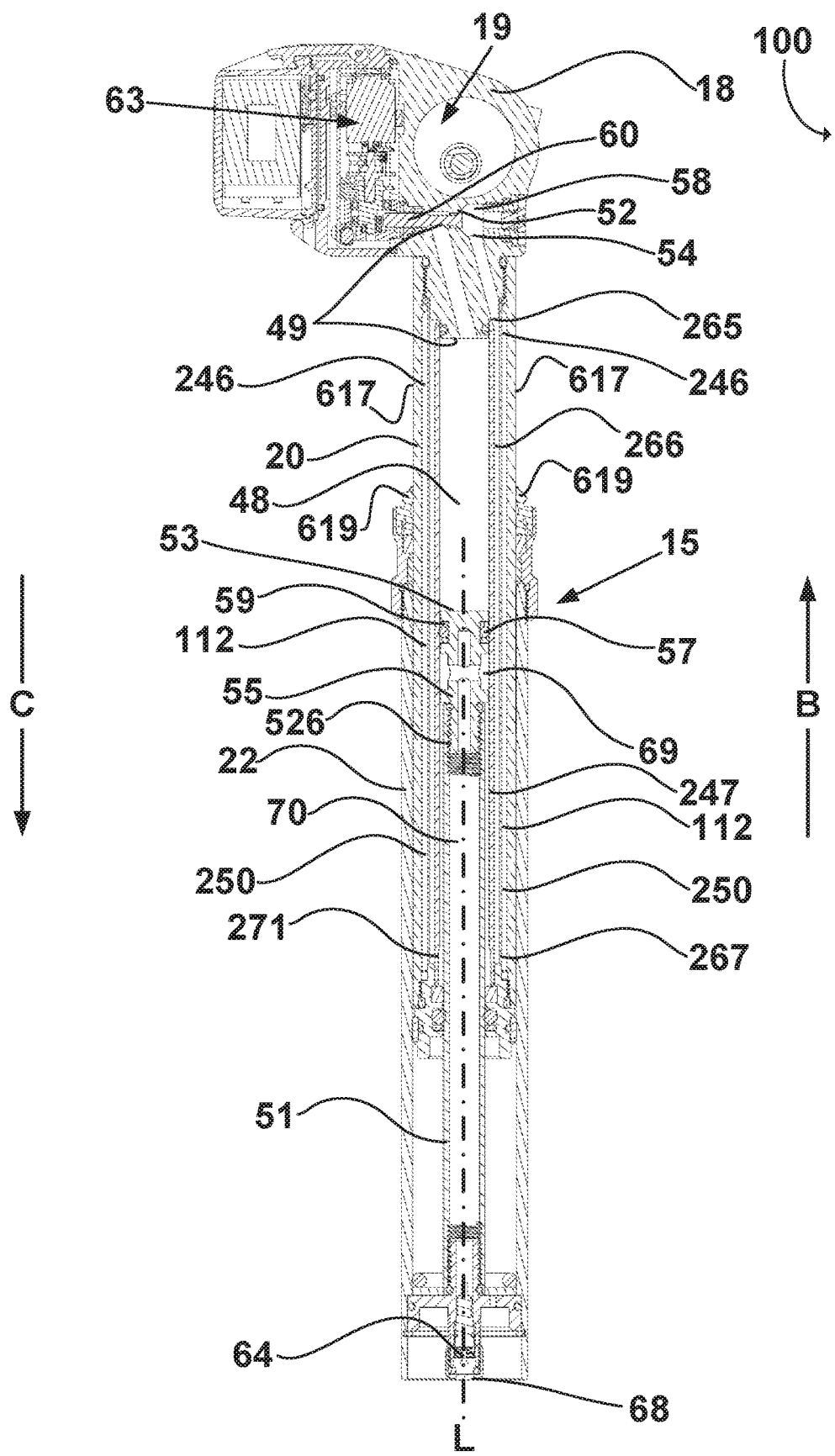
FIG. 5 is a bisected cross-sectional view of an embodiment of a seating component.

FIG. 5 is a bisected cross-sectional view of an embodiment of the seating component 15. The example shown in FIGS. 5-7 differs from the example shown in FIGS. 2-4 in that the bypass device 266 is disposed concentrically about the hydraulic support chamber 48. In this embodiment, although the structure is changed, the fluid communication characteristics may remain similar to those of the example shown in FIGS. 2-4.

Figure 6:
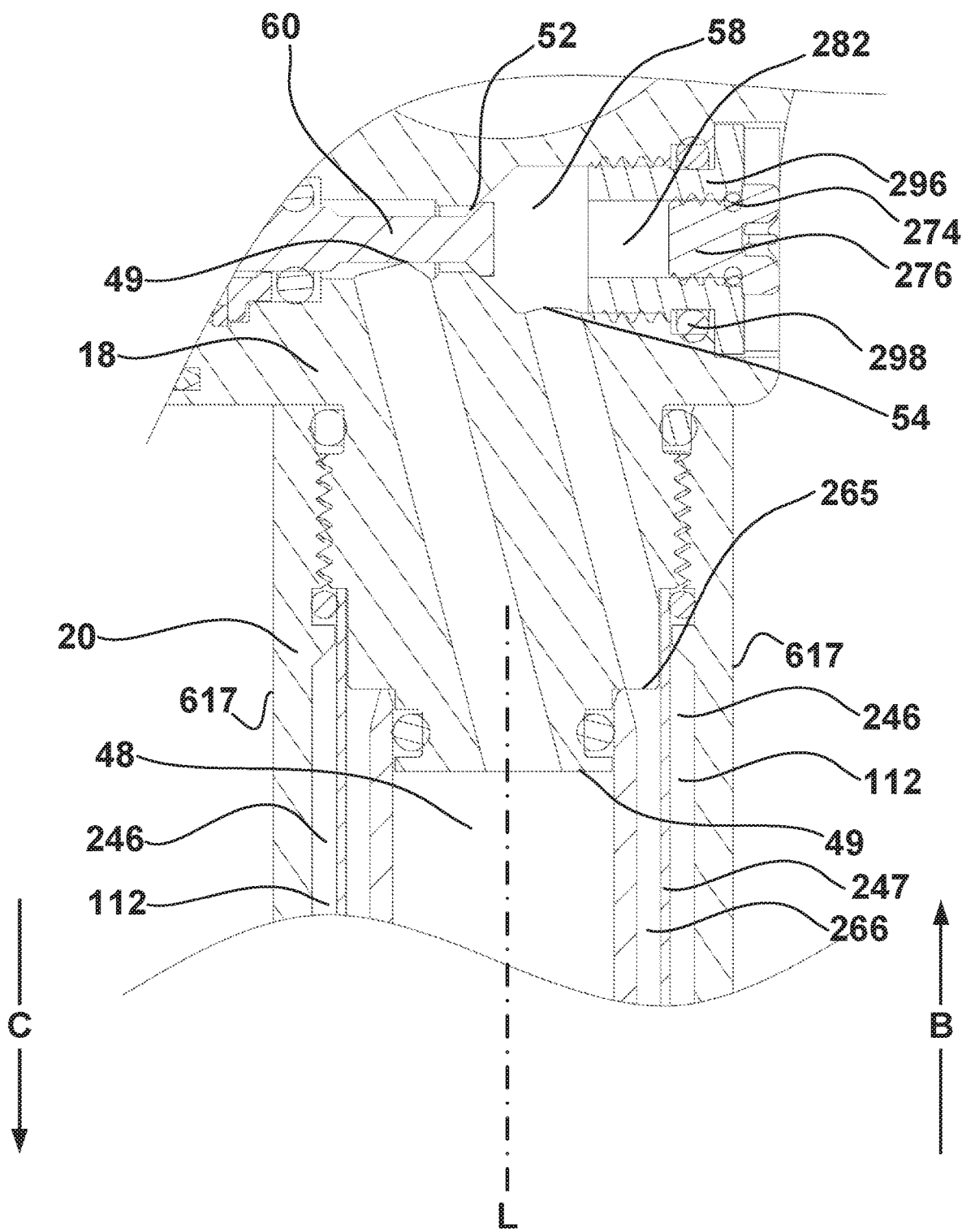
FIG. 6 is an enlarged view of the seating component of FIG. 5, illustrating detail of a seat post upper and associated components.

FIG. 6 is an enlarged view of the seating component 15 of FIG. 5, illustrating detail of a seat post upper 20 and associated components. The bypass device 266 opens to the hydraulic exchange chamber 58 through at least one of the bypass proximal opening 265 and the reservoir opening 54. The installation component 296 and associated components may be configured for similar functions as in the example shown in FIGS. 2-4.

Figure 7:
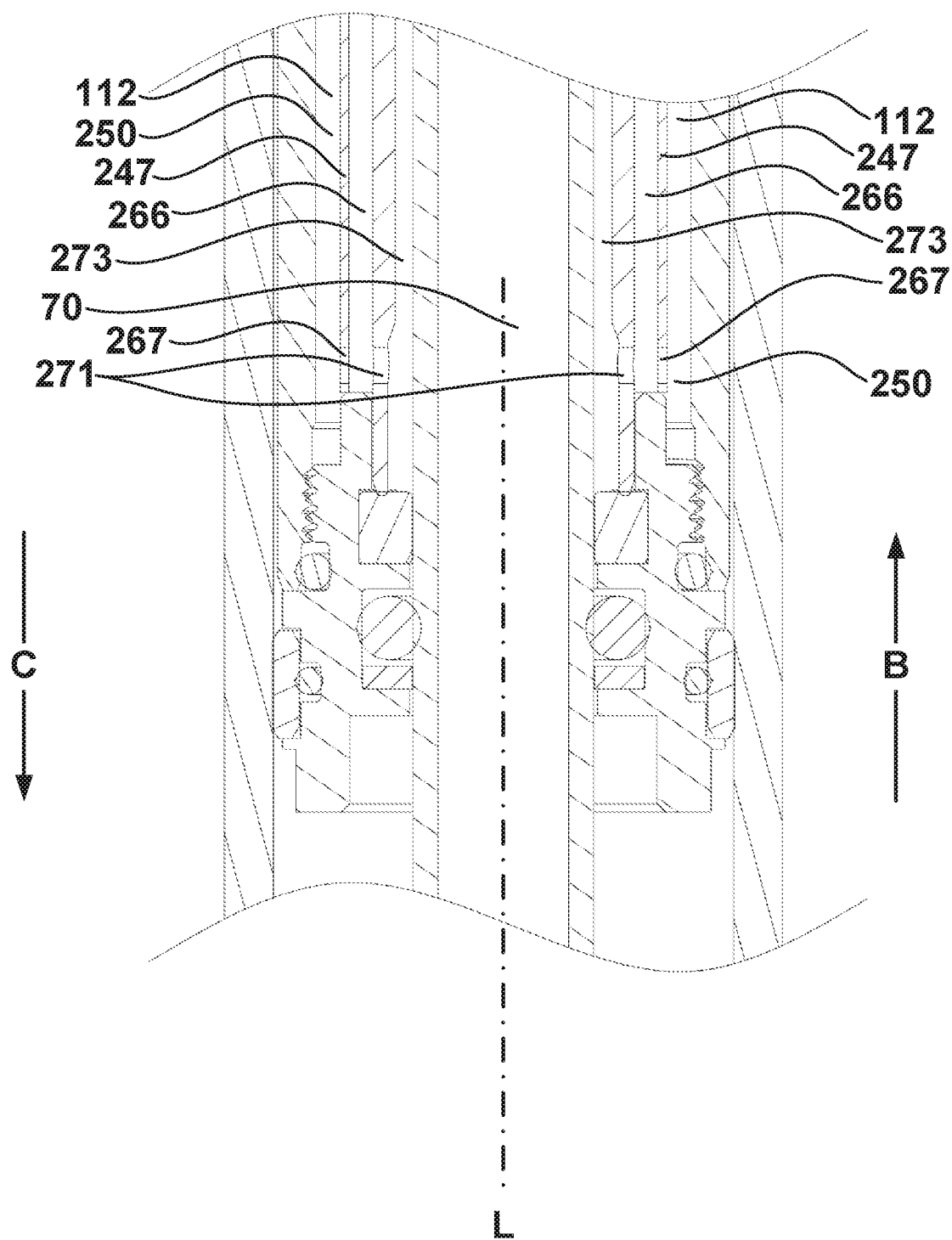
FIG. 7 is an enlarged view of the seating component of FIG. 5, illustrating detail of a seat post lower and associated components.

FIG. 7 is an enlarged view of the seating component 15 of FIG. 5, illustrating detail of a seat post lower 22 and associated components. The bypass device 266 is shown having the bypass distal opening 267 opening into the hydraulic reservoir portion 250 of the communication chamber 112. The adjustment path 70 may be in fluid communication with an entry path 273 through the adjustment opening 69. The entry path 273 may have the entry opening 271 into the bypass device 266 and/or the communication chamber 112. As shown, the entry opening 271 fluidly connects the entry path 273 to the bypass device 266. However, the entry opening 271 may also be configured to fluidly connect the entry path 273 directly to the communication chamber 112. For instance, the entry opening 271 may be a port passing through the bypass device 266 to connect the entry path 273 to the communication chamber 112.

Figure 8:
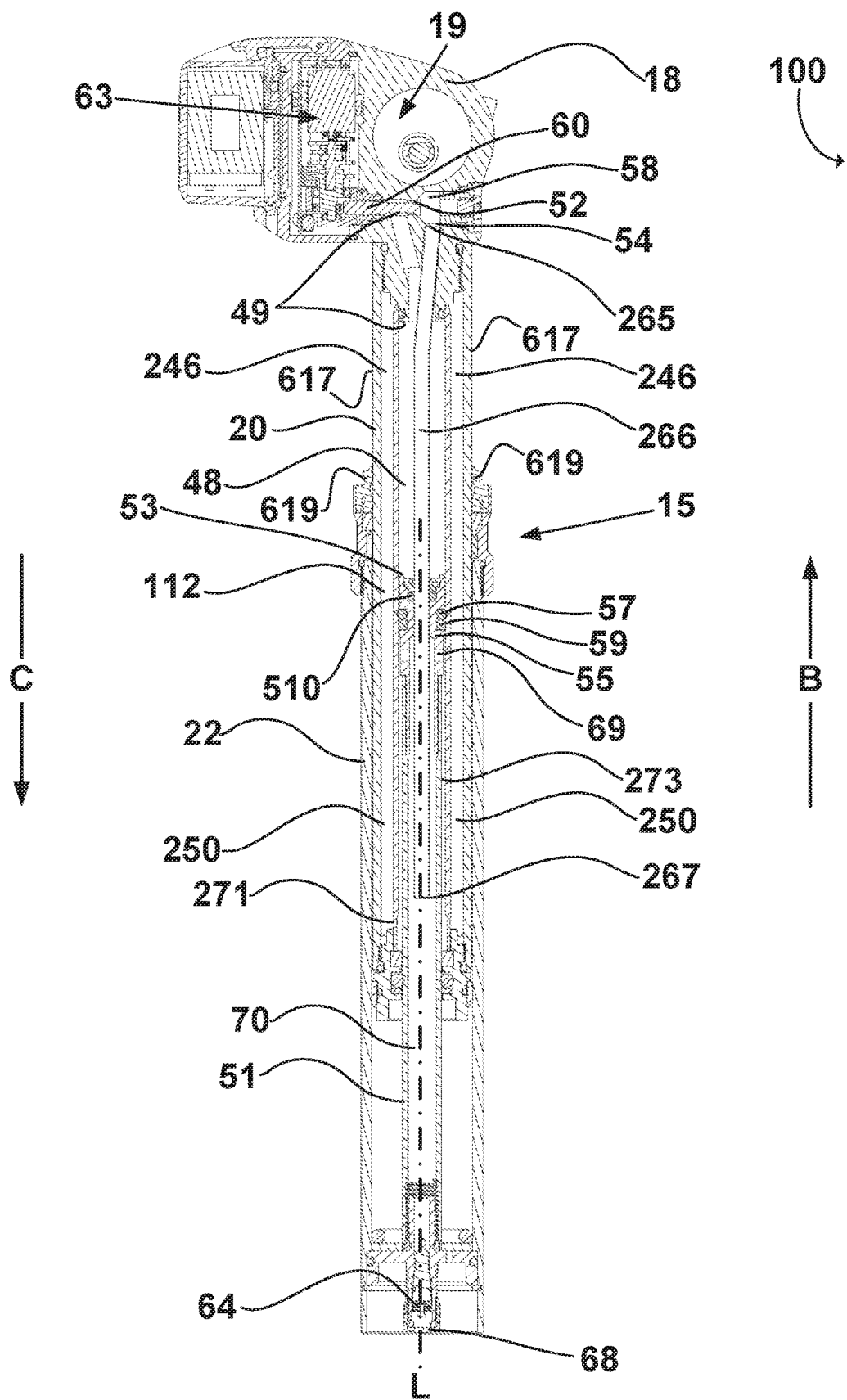
FIG. 8 is a bisected cross-sectional view of an embodiment of the seating component.
Figure 9:
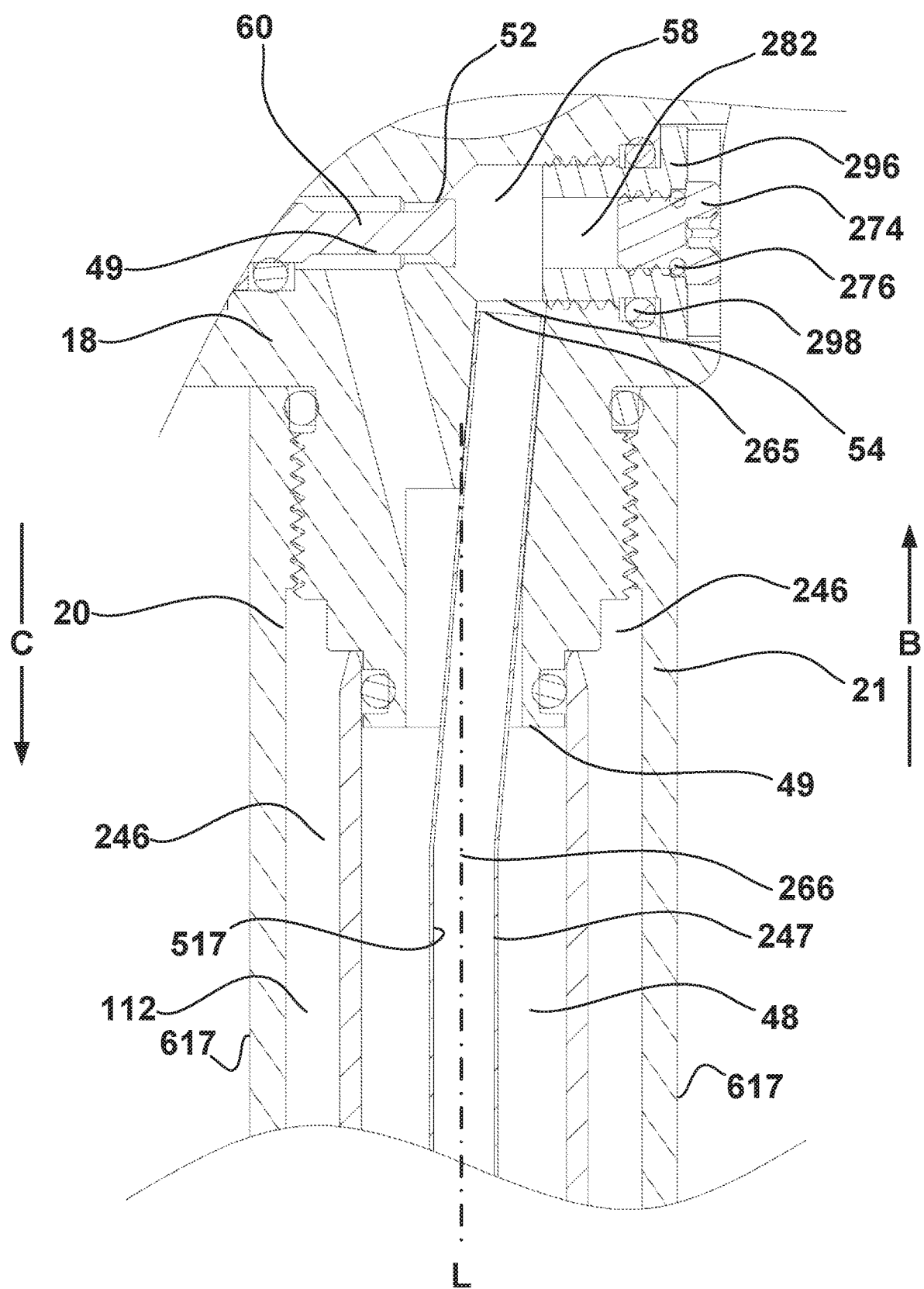
FIG. 9 is an enlarged view of the seating component of FIG. 8, illustrating detail of a seat post upper and associated components.
Figure 10:
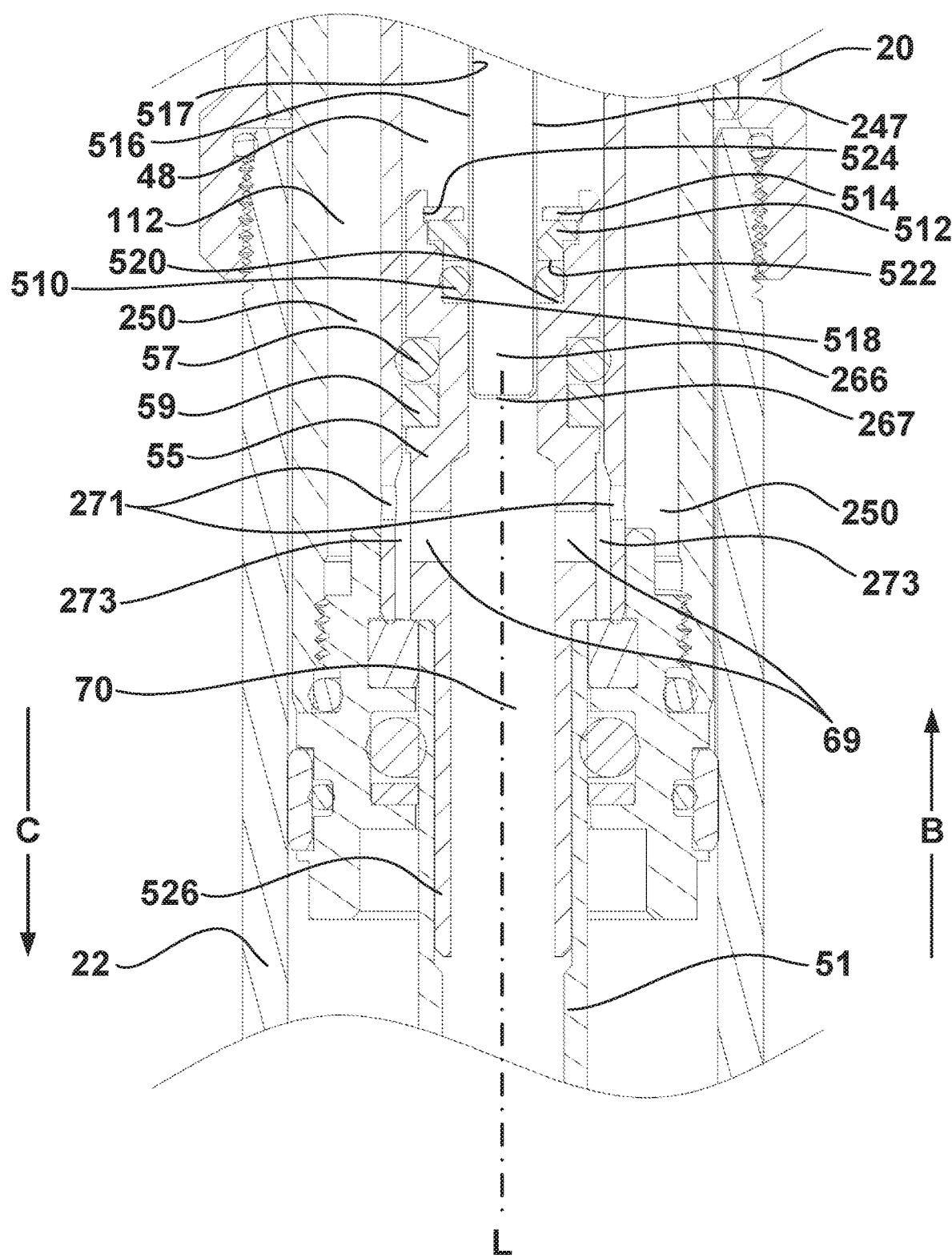
FIG. 10 is an enlarged view of the seating component of FIG. 8, illustrating detail of a seat post lower and associated components.

FIG. 8 is a bisected cross-sectional view of an embodiment of the seating component 15. The example shown in FIGS. 8-10 differs from the examples shown in FIGS. 2-7 in that the bypass device 266 is disposed partially within the hydraulic support chamber 48. Also as shown, the bypass device 266 may pass through the lower support surface 53 of the piston 55. In this configuration, the piston 55 is fixed relative to the seat post lower 22 and the bypass device 266 is fixed relative to the seat post upper 20. Thus, in this embodiment, relative movement of the seat post upper 20 and the seat post lower 22, as achieved through raising and lowering of the saddle 16, will necessitate relative movement of the piston 55 and the bypass device 266.

It may therefore be useful that the bypass device 266 and the piston 55 maintain a sealed state of the hydraulic support chamber 48. In such a way, the hydraulic support chamber 48 may maintain its volume when the actuation valve 52 is in its closed state. Similarly, the transport of fluid into and out of the hydraulic support chamber when the actuation valve 52 is in its open state may be limited to fluid passing through the actuation valve 52.

A bypass seal 510 may be provided to facilitate sealing of the hydraulic support chamber 48. The bypass seal 510 is configured to seal between a barrier sealing surface 516 of the bypass barrier 247 and a piston sealing surface 518 of the piston 55. The bypass seal 510 may be an elastomeric seal such as an O-ring. The barrier sealing surface 516 may be an annular outer surface of the bypass device 266. Relative movement of the barrier sealing surface 516 and the bypass seal 510 along the axis L may necessitate that the bypass seal 510 be configured as a dynamic seal. For instance, the bypass seal 510 may be located axially between components of the piston 55. Axial location of the bypass seal 510 may also function to limit axial deformation of the bypass seal 510 under pressure and thus limit wear.

In an exemplary embodiment, the bypass seal 510 may be axially located in the lowering direction C by a lower seal locating surface 520 of the barrier. The lower seal locating surface 520 may be formed through the same process or techniques as an annular configuration of the piston sealing surface 518 in order to reduce manufacturing cost. The piston 55 may be channeled, cambered, or counterbored. The lower seal locating surface 520 may also be formed by one or more different techniques.

The piston sealing surface 518 may be machined as an annular recess in the piston 55. Material of the piston 55 not machined to form the piston sealing surface 518 may form the lower seal locating surface 520. The lower seal locating surface 520 may form a lower axial boundary of the piston sealing surface 518. An upper seal locating surface 522 may form an upper axial boundary of the piston sealing surface 518. Alternatively, the piston sealing surface 518 may be machined leaving only the lower seal locating surface 520. In this example, the upper seal locating surface 522 may be formed as part of a seal location device 512.

The seal location device 512 may be removable to facilitate installation and removal of the bypass seal 510. The seal location device 512 may be secured to the piston through various techniques such as a threaded interface or adhesive attachment. The seal location device 512 may also be secured using a lock device 514. The lock device 514 may be a threaded device or else may be a retaining ring, such as a circlip, configured to locate in a lock recess 524 of the piston 55. The seal location device 512, the bypass seal 510, and/or the lock device 514 may be tapered to facilitate installation of the bypass device 266.

The bypass seal 510 may be configured to remain in sealing contact with the barrier sealing surface 516 during relative movement of the seat post upper 20 and the seat post lower 22. Thus, when the seating component 15 is fully extended in the raising direction B the bypass device 266 may still pass through the piston 55, maintaining sealing contact between the bypass seal 510 and the barrier sealing surface 516. As such, the hydraulic exchange chamber 58 and the adjustment path 70 may remain in fluid communication through the bypass device 266.

The bypass sealing surface 516 may be configured with an outer wall. For example, the outer wall may be disposed within one or more components of the seating component 15. For example, an outer wall configuration of the bypass sealing surface 516 may be disposed within the hydraulic support chamber 48. In an embodiment, the outer wall configuration of the bypass sealing surface 516 is in fluid communication with the hydraulic support chamber. The bypass seal 510 may form a seal with the outer wall configuration of the bypass sealing surface 516 to seal the hydraulic support chamber 48.

A barrier inner surface 517 may be provided on the interior of the bypass device 266. For example, the barrier inner surface 517 may be opposite the outer wall configuration of the barrier sealing surface 516. The barrier inner surface 517 may be referred to as an inner wall. The barrier inner surface 517 may be disposed within one or more components of the seating component 15. For example, the barrier inner surface 517 may be disposed in the hydraulic support chamber 48. In an embodiment, the barrier inner surface 517 is sealed from fluid communication with the hydraulic support chamber 48. For example, the hydraulic support chamber 48 may only pass fluid to or from the barrier inner surface 517 across the actuation valve 52. In an embodiment, the barrier inner surface 517 is concentric with the barrier sealing surface 516.

The bypass device 266 may be configured to facilitate direct or indirect fluid communication between the hydraulic exchange chamber 58 and the communication chamber 112. For instance, the bypass device 266 may have its bypass proximal opening 265 into the hydraulic exchange chamber 58 and its bypass distal opening 267 into the adjustment path 70. The adjustment path 70 may then be fluidly connected to the entry path 273 through the adjustment opening 69. The entry path 273 may then be fluidly connected to the communication chamber 112 through the entry opening 271.

Figure 11:
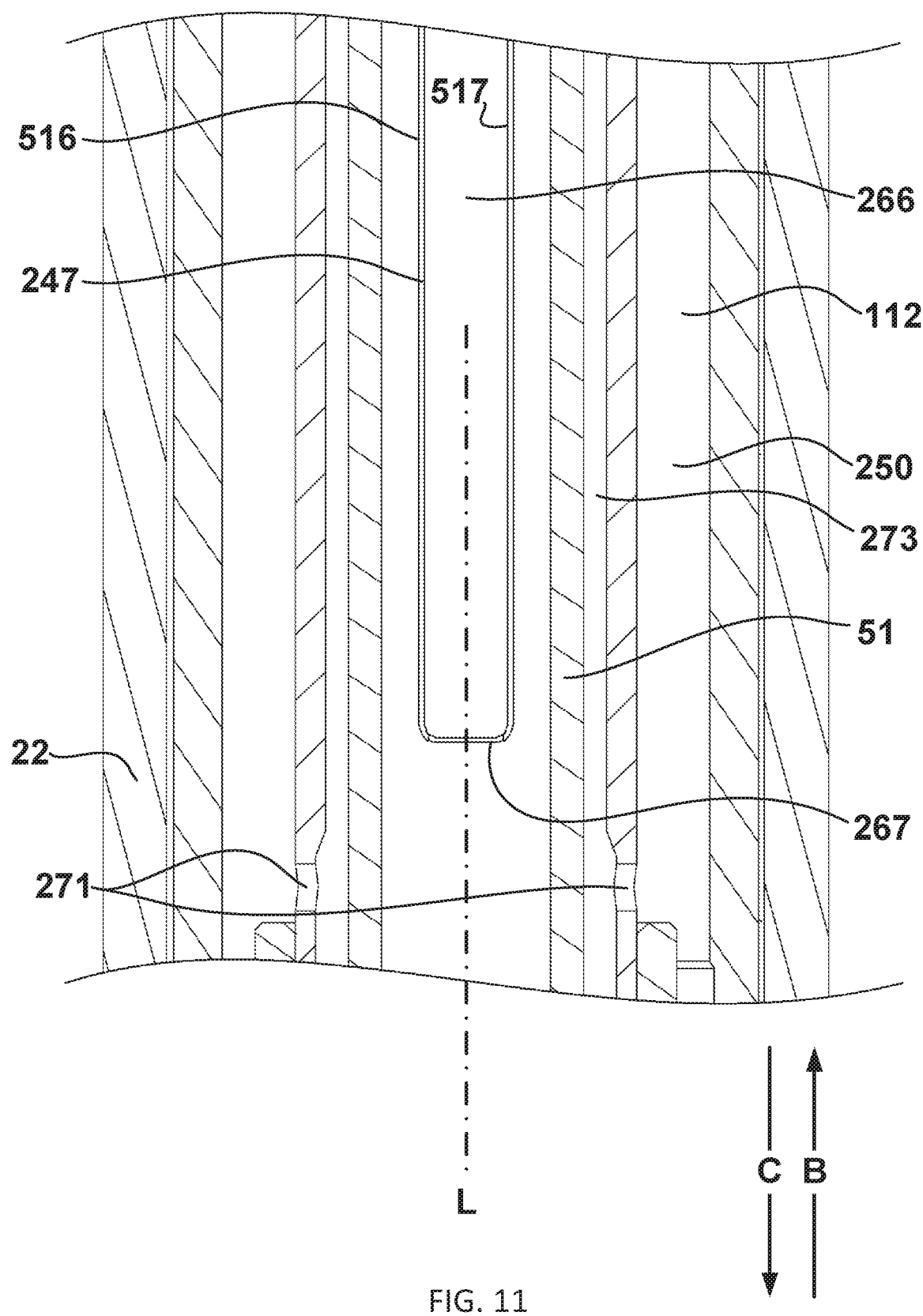
FIG. 11 is an enlarged view of the seating component of FIG. 8, illustrating detail of a seat post lower and opening configurations of a bypass device.

One or both of the bypass proximal opening 265 and the bypass distal opening 267 may be configured for specific flow characteristics. For instance, the bypass distal opening 267 may be configured to avoid uptake of relatively less dense fluids. FIGS. 11-15 show the various embodiments of the bypass distal opening 267 at an intermediate extension position of the seating component 15. FIG. 11 shows the bypass distal opening 267 having an annular communication channel configuration at a terminal end of the bypass device 266.

The bypass distal opening 267 may comprise various openings. For example, the bypass distal opening 267 may comprise radial openings and/or axial openings relative to the axis L. An axial orifice may be included in the bypass distal opening 267. An axial orifice configuration of the bypass distal opening 267 may be shaped and sized to facilitate evacuation of low density fluids. For example, an axial orifice may be angled, such as in a non-right cylindric section configuration. A plurality of axial orifices may be provided.

A radial configuration of the bypass distal opening 267 may be provided. For example, the bypass distal opening 267 may comprise at least one of a radial orifice relative to the axis L. In an embodiment, the bypass distal opening 267 comprises a plurality of radial orifices. Radial orifices may be provided independently of or in conjunction with axial orifices. Similarly, axial orifices may be provided independently of radial orifices.

Figure 12:
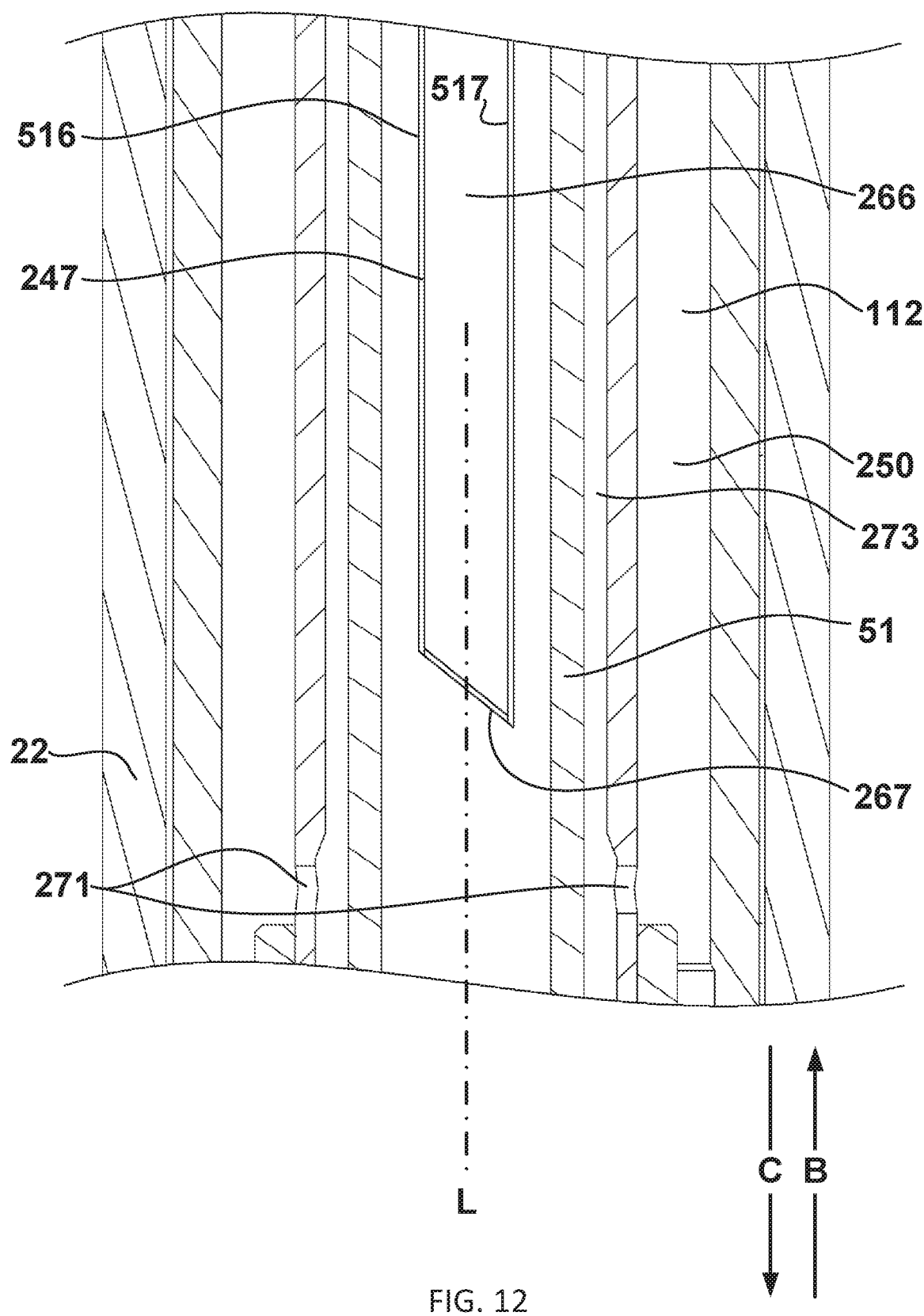
FIG. 12 is an enlarged view of an alternative embodiment of the seating component.
Figure 13:
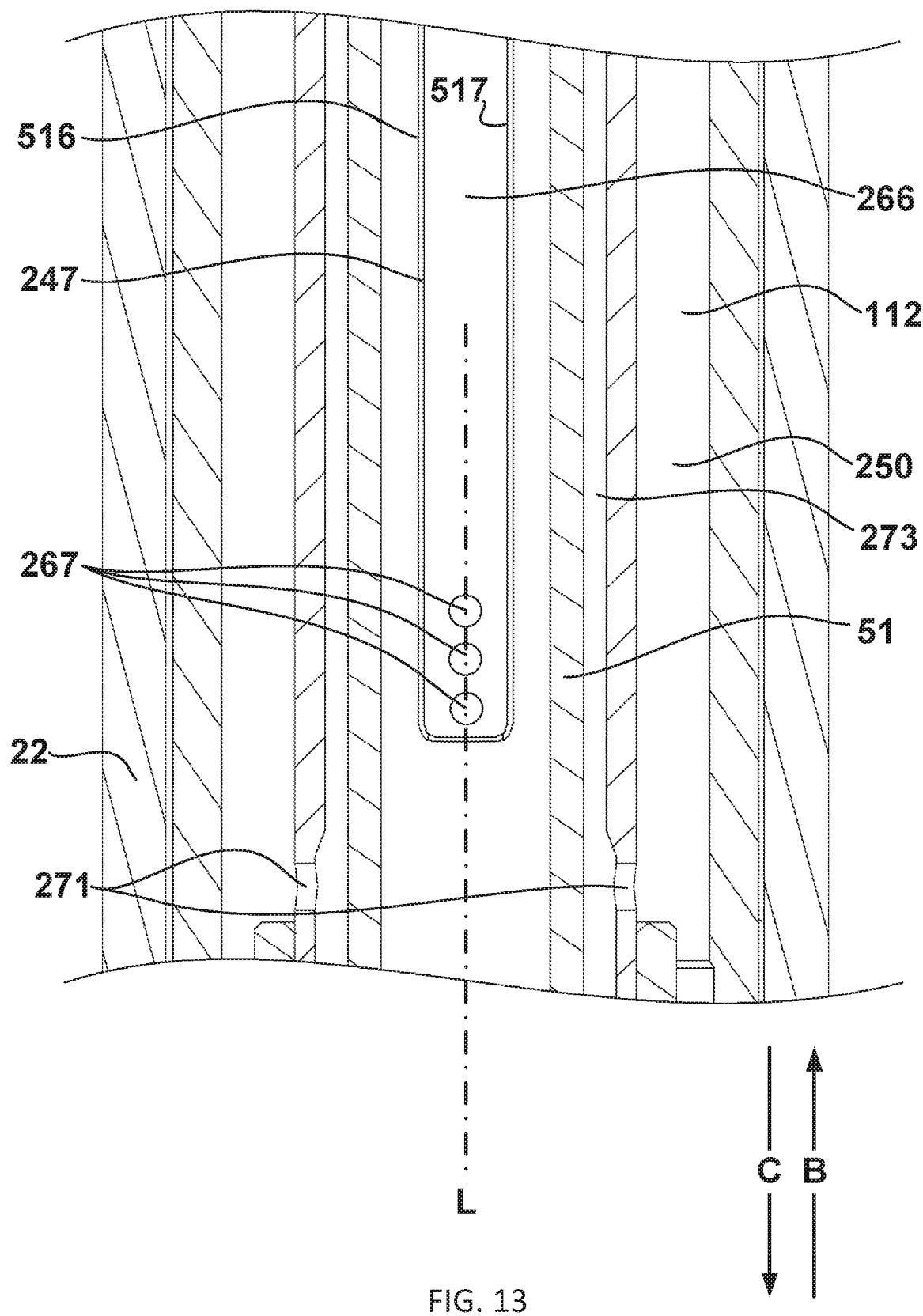
FIG. 13 is an enlarged view of an alternative embodiment of the seating component.
Figure 14:
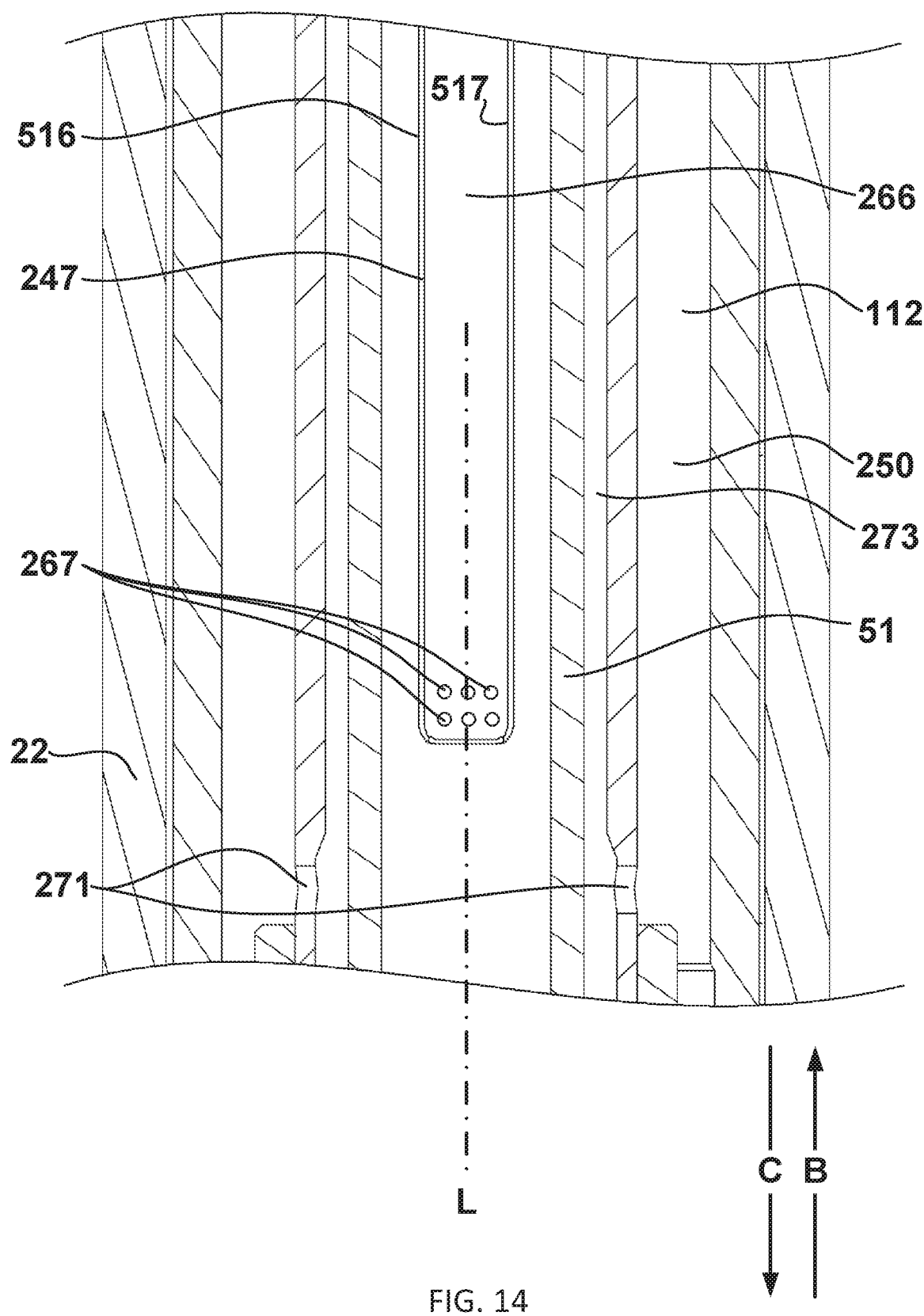
FIG. 14 is an enlarged view of an alternative embodiment of the seating component.
Figure 15:
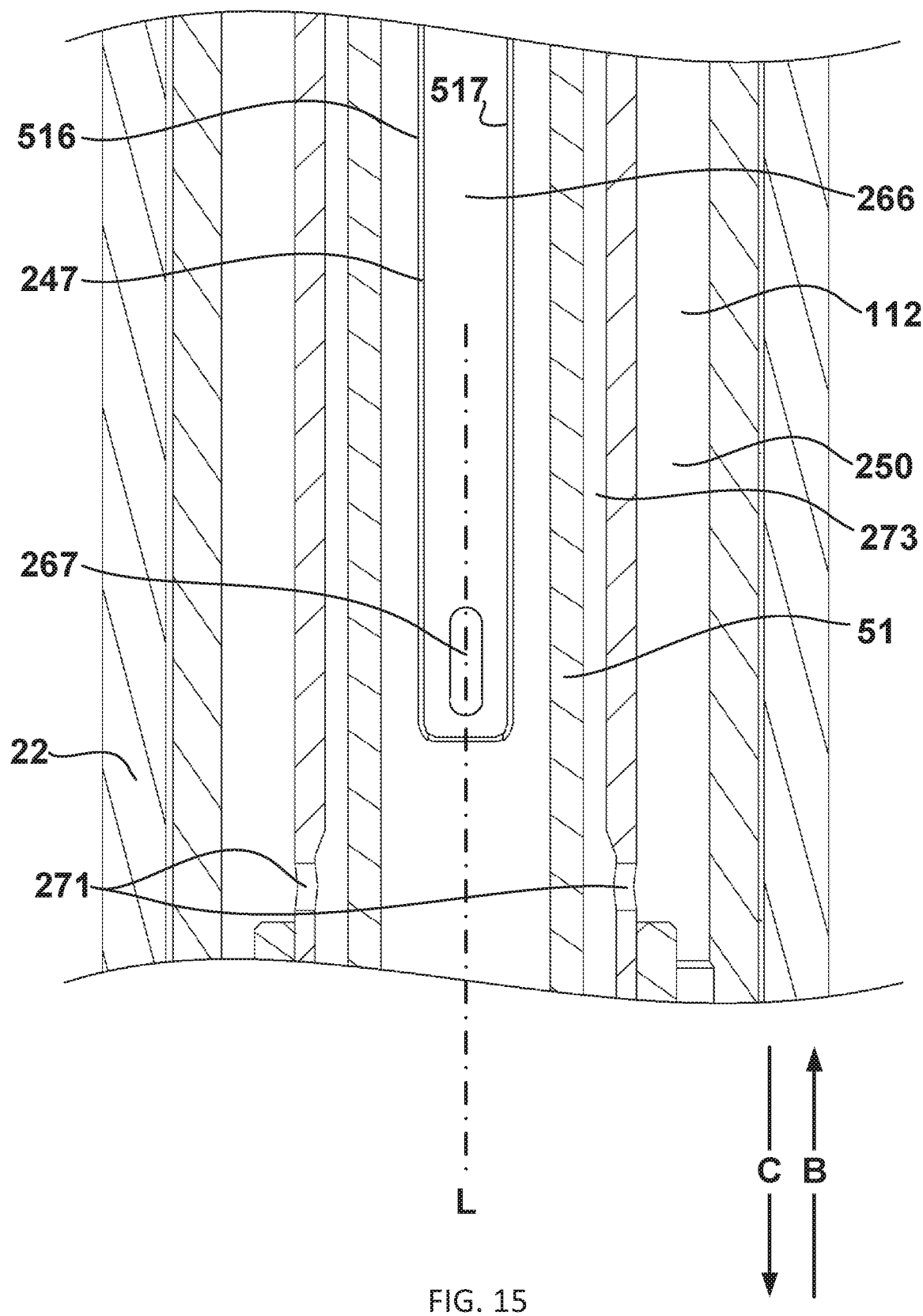
FIG. 15 is an enlarged view of an alternative embodiment of the seating component.

In one exemplary embodiment shown in FIG. 12, the bypass distal opening 267 has an elliptical cross-sectional area as defined by an angled end of an annularly configured bypass device 266. Alternatively, one or both of the bypass distal opening 267 and the bypass proximal opening 265 may be a plurality of fluid communication channels in the bypass device 266. For example, FIG. 13 shows the bypass distal opening 267 to include a plurality of radially-extending fluid communication channels spaced apart axially. The plurality of radially-extending fluid communication channels may also be spaced apart about a circumference of the bypass barrier 247 as shown in FIG. 14. Such channels may be variously shaped. For example, FIG. 15 shows channels of a slotted or oblong configuration.

Figure 16A:
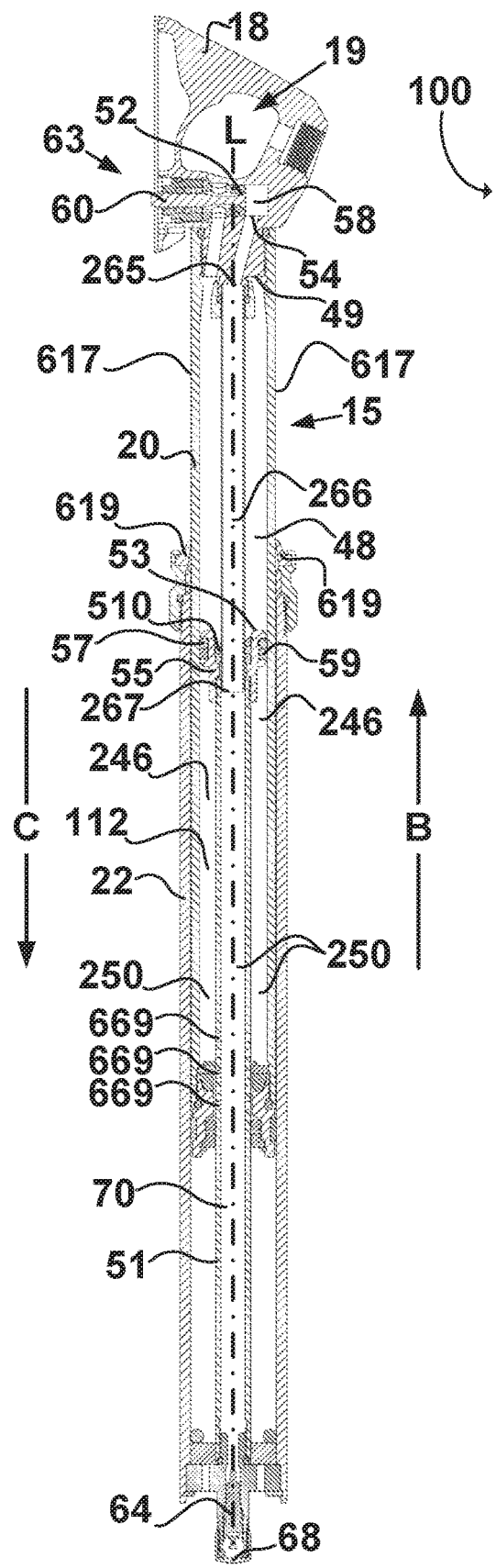
FIG. 16A is a bisected cross-sectional view of an embodiment of the seating component in a raised position.
Figure 16B:
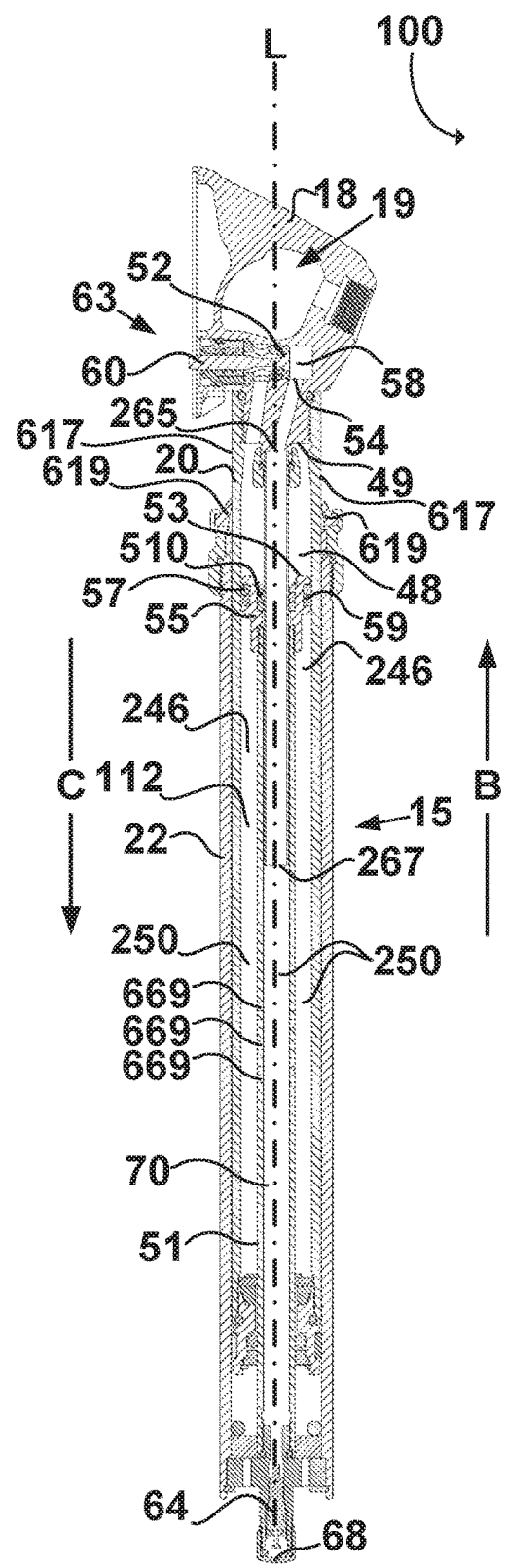
FIG. 16B is a bisected cross-sectional view of an embodiment of the seating component in a lowered position.

FIGS. 16A and 16B illustrate another embodiment of the seating component 15. The embodiment of FIGS. 16A-19 differ from those of previous figures in that the piston sealing surface 518 is provided as an interior wall of the seat post upper 20. The piston 55 seals against the barrier sealing surface 516 of the bypass device 266 and the piston sealing surface 518 of the seat post upper 20. This embodiment may be operated using an actuation device as previously described.

Figure 17:
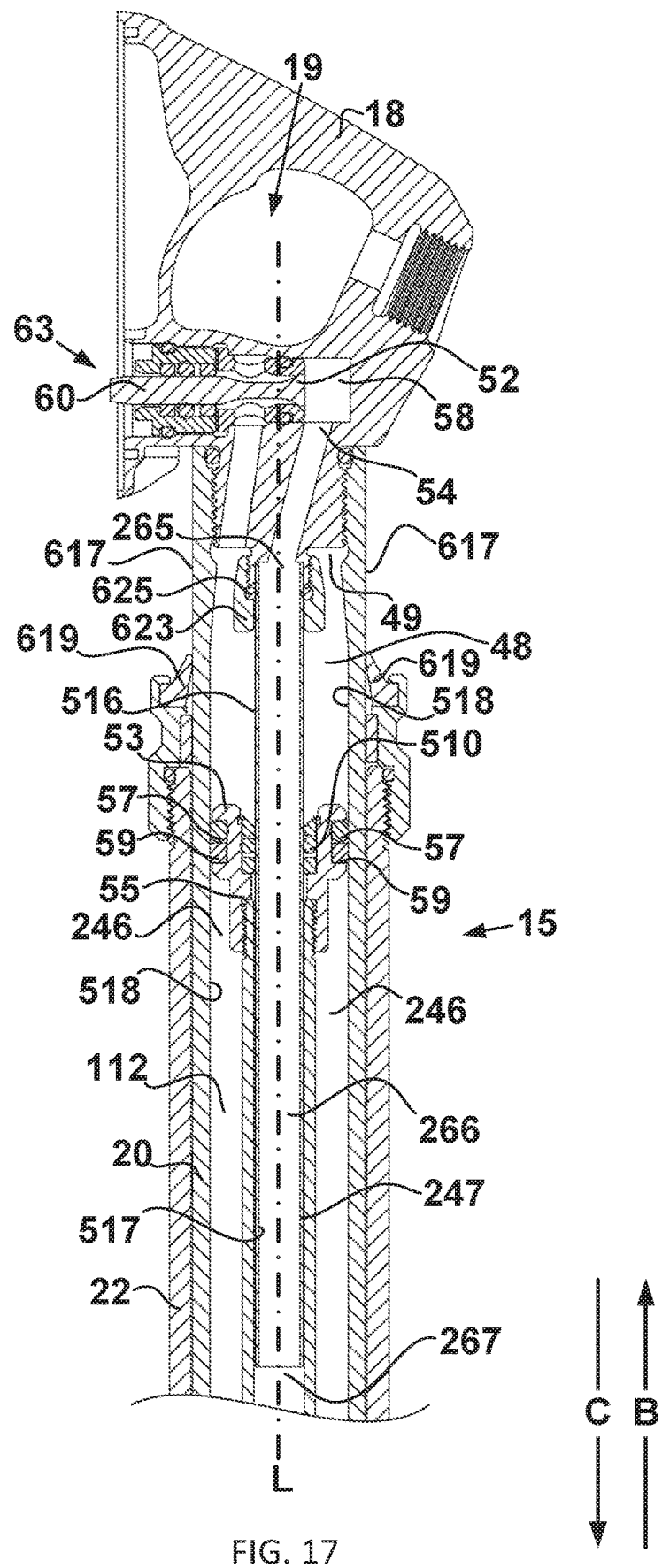
FIG. 17 is an enlarged view of the seating component of FIG. 16B.

Referring to FIG. 17, the hydraulic support chamber 48 is disposed between the piston sealing surface 518 and the barrier sealing surface 516. The piston seal 57 and the bypass seal 510 may be provided to seal the hydraulic support chamber. Relatively low density fluids, for instance air or other gasses, may collect near the top of the hydraulic support chamber 48 in the raising direction B. The seating component 15 may be configured to preferentially expel fluid from near the top of the hydraulic support chamber 48.

The seat post upper 20 may be configured with the piston sealing surface 518. For example the piston sealing surface 518 may be disposed on the interior of the upper wall 21. The upper wall 21 may also be provided with an upper outer surface 617. For example, the exterior of the upper wall 21 may provide the upper outer surface 617. In an embodiment, an outer seal 619 is provided to seal with the upper outer surface 617. For example, the outer seal 619 may be attached to the seat post lower 22 and configured to seal the seating component 15 from an external volume 100. The external volume 100 may be at atmospheric conditions. In an embodiment, the upper outer surface 617 and the piston sealing surface 518 are disposed concentrically on opposite sides of the upper wall 21.

Various components may be described in relation to the axis L. For example, the barrier inner surface 517 may be disposed radially inward of the barrier sealing surface 516. In an embodiment, the barrier sealing surface 516 may be disposed radially inward of the piston sealing surface 518. In another embodiment, the piston sealing surface 518 may be disposed radially inward of the upper outer surface 617. In yet another embodiment, the barrier inner surface 517 is disposed radially inward of the barrier sealing surface 516, which is disposed radially inward of the piston sealing surface 518, which is disposed radially inward of the upper outer surface 617.

In an embodiment, the actuation valve 52 is disposed above the hydraulic support chamber 48. For example, the actuation valve 52 may be near or at a highest point of a flow path within the seating component 15. The bypass device 266 may be in fluid communication with the hydraulic support chamber 48 across the actuation valve 52. Alternatively, the bypass device 266 may be disposed at least in part between the actuation valve and the hydraulic support chamber 48.

The bypass device 266 may be configured to control flow between the hydraulic support chamber 48 and the communication chamber 112. For example, the diameter of the bypass device 266 may be relatively restricted to maintain a two-phase flow during compression of the seating component 15. In an embodiment, the bypass device is configured to preferentially flow gaseous fluids from the hydraulic support chamber to the communication chamber 112.

The bypass device 266 may further be configured with a barrier lock 623. The barrier lock 623 may be provided to secure the bypass barrier 247. For example, the barrier lock 623 may secure the bypass barrier 247 to the seat post upper 20 and/or the seat post head 18. In an embodiment, the barrier lock 623 is threadably attachable to the seat post head 18 concentrically about the bypass barrier 247. The barrier lock 623 may also be attachable by press-fit, adhesive, and/or other suitable procedures.

The bypass device 266 may be configured with a lock seal 625. For example, the lock seal 625 may seal the bypass barrier 247. The lock seal 625 may be disposed between the bypass barrier 247 and the barrier lock 623. In an embodiment, the lock seal 625 forms a sealing arrangement with the barrier sealing surface 516 of the bypass barrier 247, the barrier lock 623, and/or the seat post head 18.

The lock seal 625 may be elastomeric. For example, the lock seal 625 may be a polymer, nitrile rubber, and/or other elastomer. In an embodiment, the lock seal 625 is an O-ring. The lock seal 625 may be a fitting, such as a metallic compression fitting. In an embodiment, the lock seal 625 is integrated with the barrier lock 623. For example, the lock seal 625 may be a flared end of the barrier lock 623.

Figure 18:
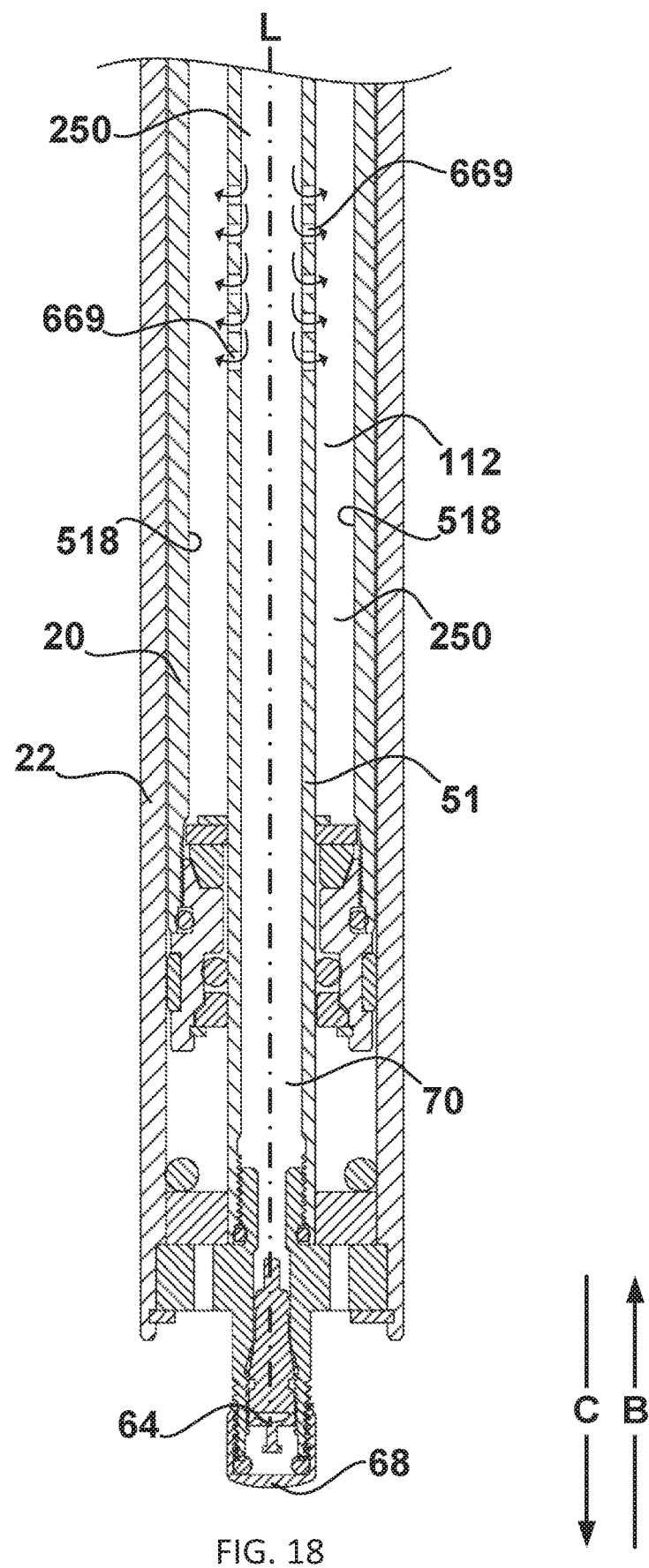
FIG. 18 is an enlarged view of the seating component of FIG. 16B.

Referring to FIG. 18, flow from the hydraulic support chamber 48 may travel through the bypass device 266 to exit the bypass device 266 through an entry opening 669. The entry opening 669 may include a plurality of entry openings. For example, the entry opening 669 may be a plurality of radial holes provided in the guide 51.

The bypass device 266 may be described as a flow path. For example, the bypass device 266 may not be constrained only by the barrier 247. In an embodiment, the bypass device 266 is the path of constrained flow from the hydraulic support chamber 48 to the communication chamber 112. The actuation valve 52 may be disposed in various locations along this path of constrained flow. For example, the actuation valve 52 may be disposed above, below, or alongside the hydraulic support chamber 48.

Figure 19:
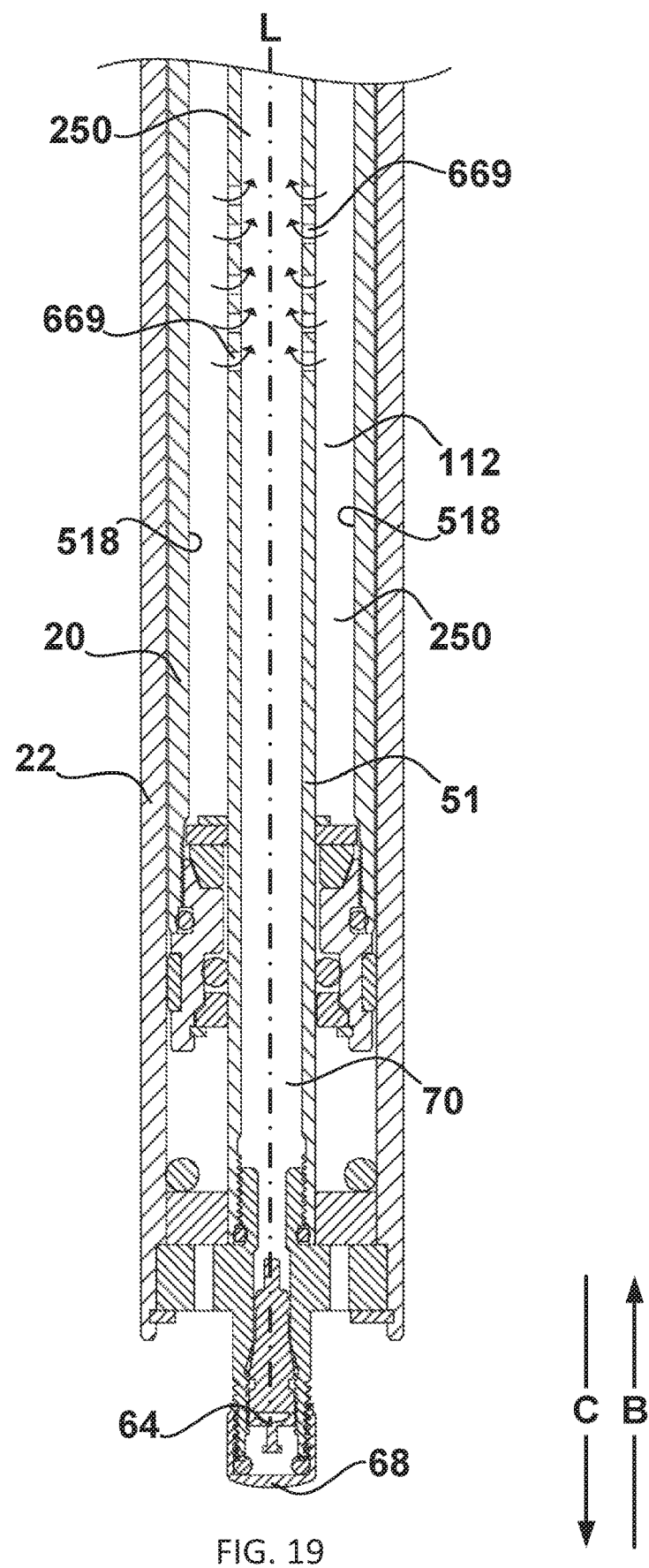
FIG. 19 is an enlarged view of the seating component of FIG. 16B.

Referring to FIG. 19, flow from the communication chamber 112 to the hydraulic support chamber 48 may also be controlled with the bypass device 266. For example, flow from a relatively low point of the communication chamber 112 may enter the entry opening 669. In an embodiment, the communication chamber 112 is only in fluid communication with the entry opening 669 below a point where the pneumatic spring portion 246 begins in normal operation.

The bypass device 266 may be configured to connect with the hydraulic support chamber 48 at a point above its connection with the communication chamber 112. For example, the bypass device 266 may begin above the hydraulic support chamber 48 and terminate below the hydraulic support chamber 48. In an embodiment, the actuation valve 52 is above the hydraulic support chamber 48 and the bypass device 266 terminates below the hydraulic support chamber 48.

Gravity separation of fluids may facilitate an operation where low density fluids are preferentially moved from the hydraulic support chamber 48 to the communication chamber 112 and high density fluids are preferentially moved from the communication chamber 112 to the hydraulic support chamber 48. As such, the communication chamber 112 may continue to contain a similar mass of the pneumatic spring portion 246 while the hydraulic support chamber 48 may continue to have relatively little compressible mass contained therein.

It should be noted that the sizes and relative locations of the hydraulic support chamber 48, the communication chamber 112, the pneumatic spring portion 246, and the hydraulic reservoir portion 250 may change during operation of the seating component 15 upwards and downwards. When the seating component 15 is in a compressed position, the sizes and relative positions of components are relevant to flow from the communication chamber 112 to the hydraulic support chamber 48, as the seating component 15 may be raised. When the seating component 15 is in an extended position, the size and relative positions of the components are relevant to flow from the hydraulic support chamber 48 to the communication chamber 112, as the seating component 15 may be lowered.

Figure 20:
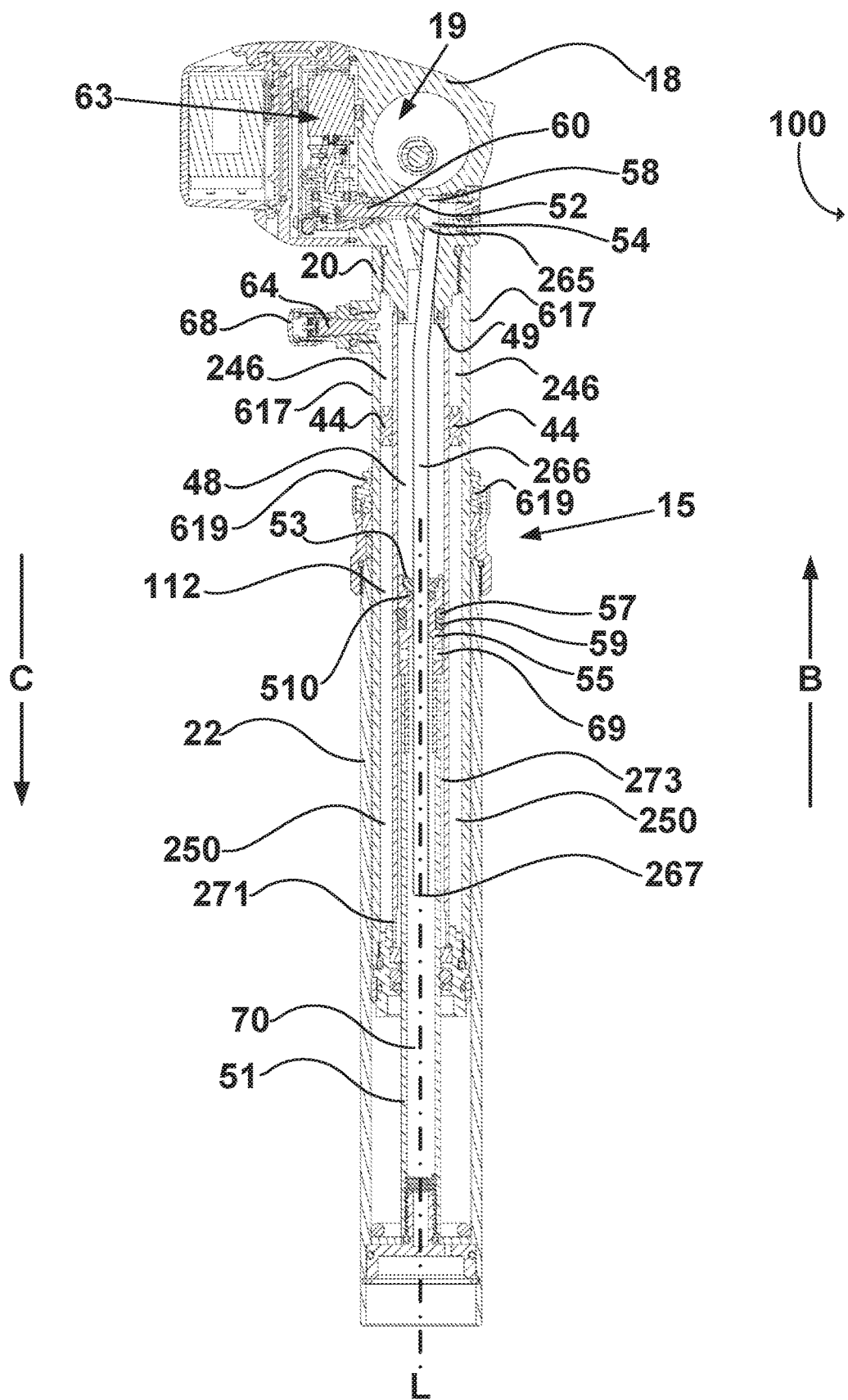
FIG. 20 is a bisected cross-sectional view of an embodiment of the seating component.

Referring to FIG. 20, the seating component 15 may also be configured to include a floating piston 44. For example, the floating piston 44 may be disposed between the pneumatic spring portion 246 and the hydraulic reservoir portion 250 of the communication chamber 112. In an embodiment, gaseous fluids expelled from the hydraulic support chamber 48 collect below the floating piston 44 in the hydraulic reservoir portion 250, following a similar flow path to previous embodiments.

The floating piston 44 may be configured as a single piece or may include multiple sealing components. For example, the floating piston may have a body, inner, and outer seals.

Figure 21:
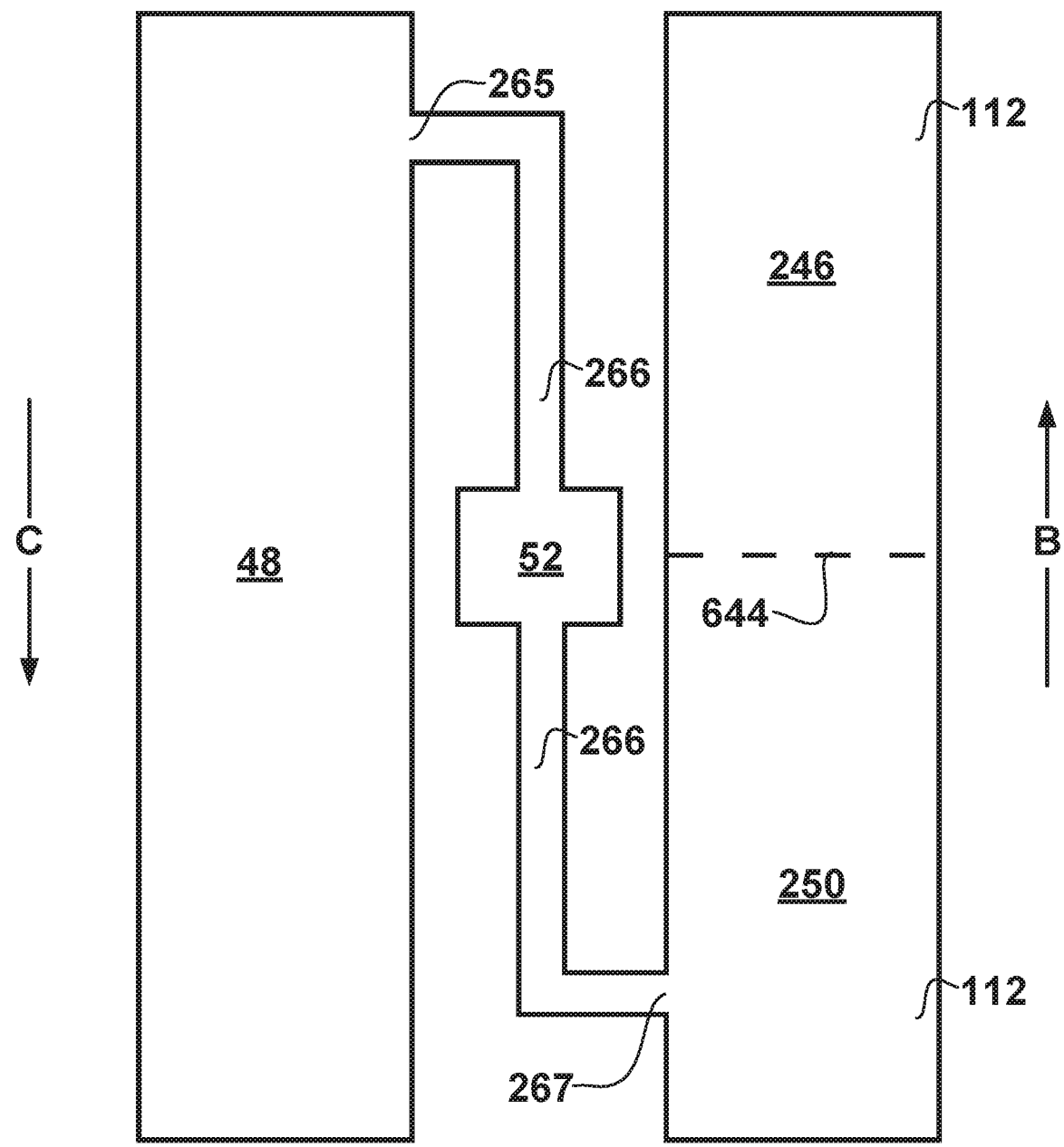
FIG. 21 illustrates a schematic view of an embodiment of the seating component.

Referring to FIG. 21, the flow path of the bypass device 266 may be described schematically. In an embodiment, the actuation valve 52 is disposed between portions of the bypass device 266. The bypass device 266 connects a high point of the hydraulic support chamber 48 with the hydraulic reservoir portion 250 through a constrained flow path. In an embodiment, the bypass device 266 connects a high point of the hydraulic support chamber 48 with a low point of the communication chamber 112. The bypass device 266 is configured such that air in the hydraulic support chamber 48 may flow to the hydraulic reservoir portion 250 through this constrained path.

As fluids enter the hydraulic reservoir portion 250 through the bypass distal opening 267 they will separate due to gravity separation. In the communication chamber 112, a portion separation 644 may be defined as the separation between the hydraulic reservoir portion 250 and the pneumatic spring portion 246. The portion separation 644 may change position as fluids flow in and out of the communication chamber 112. The portion separation 644 may also be the floating piston 44.

In an embodiment, the seating component 15 has the opening 267 is formed in the barrier 247. In another embodiment, a floating piston 44 is disposed between the reservoir 250 and the spring portion 246 and configured to seal the spring portion 246 from the reservoir 250. In yet another embodiment, the support chamber 48 is housed within the upper 20 and the upper 20 includes a saddle connection portion 19. In yet another embodiment, the opening 267 comprises at least one of an axial orifice and a plurality of radial orifices. In yet another embodiment, the opening 267 is formed as a non-right cylindric section of the barrier 247.

In an embodiment, the bypass 266 passes through the spring portion 246. In another embodiment, the bypass 266 passes through the support chamber 48. In yet another embodiment, the support chamber 48 further comprises an upper support surface 49 and a lower support surface 53, wherein the bypass 266 passes through the upper support surface 49 and the lower support surface 53. In yet another embodiment, the barrier 247 further comprises the barrier sealing surface 516, which may be known as an outer wall, in fluid communication with the support chamber and the barrier inner surface 517 sealed from fluid communication with the support chamber 48 when the valve 52 is in a closed state. In yet another embodiment, the seating component 15 further comprises a bypass seal 510 in sealing contact with the barrier sealing surface 516 of the barrier, the bypass seal 510 configured to seal the support chamber 48. In yet another embodiment, the bypass seal 510 is dynamic. In yet another embodiment, the bypass seal 510 forms a seal with a piston 55, the piston 55 comprising a piston seal 57 configured to seal the support chamber 48, for example with the piston sealing surface 518. In yet another embodiment, the piston seal 57 is dynamic and is further configured to seal the support chamber 48 from the spring portion 246. In yet another embodiment, a guide 51 is affixed to the piston, the guide 51 comprising an adjustment path 70 housed within the guide 51 and an entry opening 271 to facilitate flow between the adjustment path 70 and the reservoir 250.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this depiction should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to fewer than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A seating component for a bicycle, comprising:
    an upper;
    a lower connected to the upper and movable relative to the upper along an axis;
    a support chamber disposed between the upper and the lower;
    a reservoir in selective fluid communication with the support chamber across a valve;
    a spring portion configured to bias the upper apart from the lower along the axis; and
    a bypass configured to provide fluid communication between the support chamber and the reservoir, the bypass comprising:
        an opening disposed beyond the support chamber in a lowering direction along the axis; and
        a barrier configured to facilitate flow from the opening to the valve,
    wherein the valve is disposed beyond the support chamber in a raising direction along the axis.

2. The seating component of claim 1, wherein the opening is formed in the barrier.

3. The seating component of claim 1, further comprising a floating piston disposed between the reservoir and the spring portion and configured to seal the spring portion from the reservoir.

4. The seating component of claim 1, wherein the support chamber is housed within the upper and the upper includes a saddle connection portion.

5. The seating component of claim 1, wherein the opening comprises at least one of an axial orifice and a plurality of radial orifices.

6. The seating component of claim 1, wherein the opening is formed as a non-right cylindrical section of the barrier.

7. The seating component of claim 1, wherein the bypass passes through the spring portion.

8. The seating component of claim 1, wherein the bypass passes through the support chamber.

9. The seating component of claim 8, wherein the support chamber further comprises:
    an upper support surface; and
    a lower support surface;
    and wherein the bypass passes through the upper support surface and the lower support surface.

10. The seating component of claim 9, wherein the barrier further comprises:
    an outer wall in fluid communication with the support chamber; and
    an inner wall sealed from fluid communication with the support chamber when the valve is in a closed state.

11. The seating component of claim 10, further comprising a bypass seal in sealing contact with the outer wall of the barrier, the bypass seal configured to seal the support chamber.

12. The seating component of claim 11, wherein the bypass seal is dynamic.

13. The seating component of claim 12, wherein the bypass seal forms a seal with a piston, the piston comprising a piston seal configured to seal the support chamber.

14. The seating component of claim 13, wherein the piston seal is dynamic and is further configured to seal the support chamber from the spring portion.

15. A seating component for a bicycle, comprising:
    an upper;
    a lower connected to the upper and movable relative to the upper along an axis;
    a support chamber disposed between the upper and the lower;
    a reservoir in selective fluid communication with the support chamber across a valve;
    a spring portion configured to bias the upper apart from the lower along the axis; and
    a bypass configured to provide fluid communication between the support chamber and the reservoir, the bypass comprising:
        a first opening; and
        a second opening disposed beyond the support chamber in a lowering direction along the axis, wherein flow between the valve and the second opening passes through the first opening.

16. The seating component of claim 15, further comprising a floating piston, the floating piston configured to seal the reservoir from the spring portion.

17. The seating component of claim 16, further comprising a barrier, the barrier comprising:
    an outer wall in fluid communication with the support chamber; and
    an inner wall sealed from fluid communication with the support chamber when the valve is in a closed state.

18. The seating component of claim 17, further comprising a piston, the piston comprising:
    a first seal configured to dynamically seal with the outer wall of the barrier; and
    a second seal configured to dynamically seal with an interior wall of the upper.

19. The seating component of claim 18, further comprising a guide affixed to the piston, the guide comprising:
    an adjustment path housed within the guide; and an entry opening to facilitate flow between the adjustment path and the reservoir.

20. A seating component for a bicycle, comprising:
an upper;
a lower connected to the upper and movable relative to the upper along an axis;
a support chamber disposed between the upper and the lower;
a reservoir in selective fluid communication with the support chamber across a valve;
a spring portion configured to bias the upper apart from the lower along the axis; and
a flow path configured to provide fluid communication between the support chamber and the reservoir, the flow path comprising:
  a first opening; and
  a second opening disposed beyond the support chamber in a lowering direction along the axis, wherein flow between the valve and the second opening passes through the first opening.

* * * * *